United States Patent
Mislove et al.

(10) Patent No.: US 9,047,628 B2
(45) Date of Patent: Jun. 2, 2015

(54) SYSTEMS AND METHODS FOR SECURING ONLINE CONTENT RATINGS

(71) Applicant: Northeastern University, Boston, MA (US)

(72) Inventors: Alan Mislove, West Roxbury, MA (US); Arash M Kakhki, Jamaica Plain, MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 14/210,214

(22) Filed: Mar. 13, 2014

(65) Prior Publication Data

US 2014/0279623 A1 Sep. 18, 2014

Related U.S. Application Data

(60) Provisional application No. 61/779,573, filed on Mar. 13, 2013.

(51) Int. Cl.
*G06Q 30/02* (2012.01)
*G06Q 10/06* (2012.01)
*G06Q 30/06* (2012.01)
*G06Q 50/00* (2012.01)

(52) U.S. Cl.
CPC ............ *G06Q 30/0282* (2013.01); *G06Q 50/01* (2013.01)

(58) Field of Classification Search
CPC .................................................. G06Q 30/0282
USPC ................... 705/1.1–912, 319, 347
See application file for complete search history.

(56) References Cited

U.S. PATENT DOCUMENTS

| 6,892,178 B1 * | 5/2005 | Zacharia .................... 705/7.29 |
| 8,554,601 B1 * | 10/2013 | Marsh et al. ................ 705/7.32 |
| 2012/0089617 A1 * | 4/2012 | Frey ............................. 707/748 |
| 2012/0215773 A1 * | 8/2012 | Si et al. ....................... 707/723 |
| 2013/0080364 A1 * | 3/2013 | Wilson et al. ................. 706/46 |
| 2013/0275511 A1 * | 10/2013 | Wilson et al. ............... 709/204 |
| 2013/0290226 A1 * | 10/2013 | Dokken ........................ 706/12 |
| 2014/0201271 A1 * | 7/2014 | Paddon ....................... 709/204 |

OTHER PUBLICATIONS

Lauw, et al., "Quality and Leniency in Online Collaborative Rating Systems," ACM Transactions on the Web, vol. 6, No. 1, Article 4, 27 pgs. (Mar. 2012).

Basu, et al., "Recommendation as Classification: Using Social and Content Based Information in Recommendation," AAAI-98 Proceedings (1998) 7 pgs.

(Continued)

*Primary Examiner* — Jonathan Ouellette
(74) *Attorney, Agent, or Firm* — Wilmer Cutler Pickering Hale and Dorr LLP

(57) ABSTRACT

Systems and methods are described for determining a weighted rating and a relative rating. In some embodiments, a receiving module and rating module are configured to receive an identity of a collector, a list of raters, and a social graph, determine for at least one rater a set of non-intersecting paths between the rater and the collector, calculate capacity values for non-intersecting paths, normalize path values, convert path values to a user weight, and apply the at least one rater's weight to the at least one rater's rating. In some embodiments, a receiving module and rating module are also configured to receive a rating for each of the items rated by the rater, calculate a transformed rating, calculate a relative rating, and assign a relative rating to an item.

20 Claims, 14 Drawing Sheets

(56) References Cited

OTHER PUBLICATIONS

Ashton, K., "The Not So Secret Business of Fake Yelp Reviews. Daily Deal Media," Available at: http://www.dailydealmedia.com/657the-not-so-secret-business-offake-yelp-reviews (Feb. 14, 2012) (8 pgs.).
"Yelp Announces Third Quarter 2012 Financial Results" Available at: http://www.yelp-ir.com/phoenix.zhtml?c=250809&p=irol-newsArticle&ID=1753250; Downloaded Oct. 21, 2014 (4 pgs.).
Abadi, et al., "Moderately Hard, Memory-bound Functions," ACM ToIT, vol. 5, No. 2, 15 pgs. (2005).
Amatriain, X. and Basilico, J., "Netflix Recommendations: Beyond the 5 stars (Part 1)," Available at: http://techblog.netflix.com/2012/04/netflix-recommendations-beyond-5-stars.html (Apr. 6, 2012) (13 pgs.).
Author Unknown, "CPLEX Optimizer," Downloaded from: http://ibm.com/software/integration/optimization/cplex-optimizer on Oct. 12, 2014 (2 pgs.).
Author Unknown, "GLPK (GNU Linear Programming Kit)," Downloaded from: http://www.gnu.org/software/glpk on Oct. 12, 2014 (3 pgs.).
Author Unknown, "Statistics," Downloaded from: http://www.youtube.com/yt/press/statistics.html on Oct. 12, 2014 (2 pgs.).
Borisov, N., "Computational Puzzles as Sybil Defenses," 6th IEEE International Conference on Peer-to-Peer Computing, pp. 171-176 (6 pgs.) (2006).
Castro, et al., "Secure Routing for Structured Peer-To-Peer Overlay Networks," OSDI, 2002 (16 pgs.).
Chirita, et al., "Preventing Shilling Attacks in Online Recommender Systems," WIDM, 2005 (8 pgs.).
Chun, et al., "Comparison of Online Social Relations in Terms of Volume vs. Interaction: A Case Study of Cyworld," IMC '08 Proceedings of the 8th ACM SIGCOMM Conference on Internet Measurement, Vouliagmeni, Greece, pp. 57-69 (13 pgs.) (Oct. 20-22, 2008).
Danezis, G. and Mittal, P., "SybilInfer: Detecting Sybil Nodes Using Social Networks," NDSS, 2009 (15 pgs.).
Douceur, J. R., "The Sybil Attack," IPTPS '01 Revised Papers from the First International Workshop on Peer-to-Peer Systems (6 pgs.) (2001).
Even, et al., "On the Complexity of Timetable and Multi-Commodity Flow Problems," Foundations of Computer Science, pp. 184-193 (10 pgs.) (1975).
Fogarty, et al., "Case Studies in the Use of ROC Curve Analysis for Sensor-Based Estimates in Human Computer Interaction," GI '05 Proceedings of Graphics Interface, pp. 129-136 (2005).
Ford, L. R. and Fulkerson, D. R., "Maximal Flow Through a Network," Can. J. Math., vol. 8, pp. 399-404 (1956).
Hwang, et al., "Promoting Oneself on Flickr: Users' Strategies and Attitudes," Group '10 Proceedings of the 16th ACM International Conference on Supporting Group Work, pp. 327-328 (2010).
Kamvar, et al., "The Eigentrust Algorithm for Reputation Management in P2P Networks," WWW '03 Proceedings of the 12th International Conference on World Wide Web, pp. 640-651 (2003).
Leskovec, et al., "Empirical Comparison of Algorithms for Network Community Detection," WWW '10 Proceedings of the 19th International Conference on World Wide Web, pp. 631-640 (2010).
Lesniewiski-Laas, C. and Kaashoek, M. F., "Whanau: A Sybil-proof Distributed Hash Table," NSDI, 2010 (16 pgs.).
Lim, et al., "Detecting Product Review Spammers using Rating Behaviors," CIKM '10 Proceedings of the 19th ACM International Conference on Information and Knowledge Management, pp. 939-948 (Oct. 26-30, 2010).
Luca, M., "Reviews, Reputation, and Revenue: The Case of Yelp.com," Harvard Business School Working Papers, 12-016, Sep. 16, 2011 (40 pgs.).
Maganis, et al., "Opaak: Using Mobile Phones to Limit Anonymous Identities Online," In Proceedings of MobiSys. 2012 (13 pgs.).
Mislove, et al., "Measurement and Analysis of Online Social Networks," IMC '07, Oct. 24-26, 2007, San Diego, California (14 pgs.).
Mitzenmacher, M. and Upfal, E., "Probability and Computing," Cambridge University Press, 2005 (364 total pages).
Mohaisen, A. and Kim, A. Y., "Measuring the Mixing Time of Social Graphs," IMC '10, Nov. 1-3, 2010, Melbourne, Australia (7 pgs.).
Moyer, M., "Manipulation of the Crowd: How Trustworthy Are Online Ratings?" Scientific American, vol. 303, Jun. 1, 2010. Available at: http://www.scientificamerican.com/article.cfm?id=manipulation-of-the-crowd (4 pgs.).
Mukherjee, et al., "Spotting Fake Reviewer Groups in Consumer Reviews," WWW '12 Proceedings of the 21st International Conference on World Wide Web, pp. 191-200 (10 pgs.) (Apr. 16-20, 2012).
Ott, et al., "Finding Deceptive Opinion Spam by Any Stretch of the Imagination," Proceedings of the 49th Annual Meeting of the Association for Computational Linguistics, Portland, Oregon, Jun. 19-24, 2011 (11 pgs.) (pp. 309-319).
Post, et al., "Bazaar: Strengthening User Reputations in Online Marketplaces," NSDI'11 Proceedings of the 8th USENIX Conference on Networked Systems Design and Implementation 2011 (14 pgs.).
Quercia, D. and Hailes, S., "Sybil Attacks Against Mobile Users: Friends and Foes to the Rescue," INFOCOM, 2010 Proceedings IEEE, 5 pgs. (2010).
Rose, M., "Microsoft Investigating Claims of Ratings Manipulation in Xbox Live Indie Games. Indie Games," Available at: http://indiegames.com/2011/03/microsoft_investigating_claims.html, Mar. 30, 2011 (3 pgs.).
Sala, et al., "Measurement-Calibrated Graph Models for Social Network Experiments," WWW 2010, Apr. 26-30, 2010, Raleigh, North Carolina, USA (10 pgs.).
Segal, D., "A Rave, a Pan, or Just a Fake?" The New York Times, Available at: http://www.nytimes.com/2011/05/22/your-money/22haggler.html, May 21, 2011 (3 pgs.).
Seuken, S. and Parkes, D. C., "On the Sybil-Proofness of Accounting Mechanisms," NetEcon'11, Jun. 5, 2011, San Jose, California, USA (7 pgs.).
Streitfeld, D., "In a Race to Out-Rave, 5-Star Web Reviews Go for $5," The New York Times, Available at: http://nytimes.com/2011/08/20/technology/finding-fake-reviews-online.html, Aug. 19, 2011 (4 pgs.).
Tran, et al, "Optimal Sybil-resilient node admission control," Proceedings of INFOCOM. 2011 (9 pgs.).
Tran, et al, "Sybil-Resilient Online Content Voting," NSDI'09 Proceedings of the 6th USENIX Symposium on Networked Systems Design and Implementation 2009 (15 pgs.).
Turner, J., "Personalization and the future of Digg," Available at: http://radar.oreilly.com/2010/03/joe-stump-talks-about-the-futu.html, Mar. 11, 2010 (2 pages).
Viswanath, et al., "An Analysis of Social Network-based Sybil Defenses," SIGCOMM'10, Aug. 30-Sep. 3, 2010, New Delhi, India (12 pgs.).
Viswanath, et al., "Canal: Scaling Social Network-Based Sybil Tolerance Schemes," EuroSys'12, Apr. 10-13, 2012, Bern, Switzerland (14 pgs.).
Viswanath, et al., "Exploring the Design Space of Social Network-Based Sybil Defense," Communication Systems and Networks (COMSNETS), 2012 Fourth International Conference, Dec. 3-7, 2012 (8 pgs.).
Von Ahn, et al., "CAPTCHA: Using Hard AI Problems for Security," Advances in Cryptology—Eurocrypt 2003, Lecture Notes in Computer Science, vol. 2656, pp. 294-311 (18 pgs.).
Wang, et al., "Review Graph based Online Store Review Spammer Detection," ICDM '11 Proceedings of the 2011 IEEE 11th International Conference on Data Mining, pp. 1242-1247 (6 pgs.) (2011).
Yelp Which to Filter. Downloaded from http://web.archive.org/web/20120530054920/www.yelp.com/faq on Oct. 21, 2014 (12 pages).
Yelp's Review Filter Explained. http://officialblog.yelp.com/2010/03/yelp-review-filter-explained.html, Mar. 18, 2010 (2 pgs.).
Yu, et al., "DSybil: Optimal Sybil-Resistance for Recommendation Systems," 2009 30$^{th}$ IEEE Symposium on Security and Privacy, May 17-20, 2009 pp. 283-298 (16 pgs.).
Yu, et al., "SybilGuard: Defending Against Sybil Attacks via Social Networks," SIGCOMM'06, Sep. 11-15, 2006, Pisa, Italy (12 pgs.) (267-278).
Yu, et al., "SybilLimit: A Near-Optimal Social Network Defense Against Sybil Attacks," IEEE Symposium on Security and Privacy, May 18-22, 2008 pp. 3-17 (15 pgs.).

\* cited by examiner

| User | # | Rating | | |
|---|---|---|---|---|
| | | Raw | Transformed | Relative |
| $U_1$ | $r_{1,1}$ | ★★ | 0.25 | 0.25 |
| | $r_{1,2}$ | ★★★★★★ | 0.75 | 0.75 |
| $U_2$ | $r_{2,1}$ | ★ | 0.1 | 0.1 |
| | $r_{2,2}$ | ★★★ | 0.3 | 0.3 |
| | $r_{2,3}$ | ★★★★★ | 0.5 | 0.5 |
| | $r_{2,4}$ | ★★★★★★★ | 0.7 | 0.8 |
| | $r_{2,5}$ | ★★★★★★★★★ | 0.9 | 0.8 |
| $U_3$ | $r_{3,1}$ | ★★★★★★★★ | 0.125 | 0.5 |
| | $r_{3,2}$ | ★★★★★★★★ | 0.375 | 0.5 |
| | $r_{3,3}$ | ★★★★★★★★ | 0.625 | 0.5 |
| | $r_{3,4}$ | ★★★★★★★★ | 0.875 | 0.5 |

FIG. 5

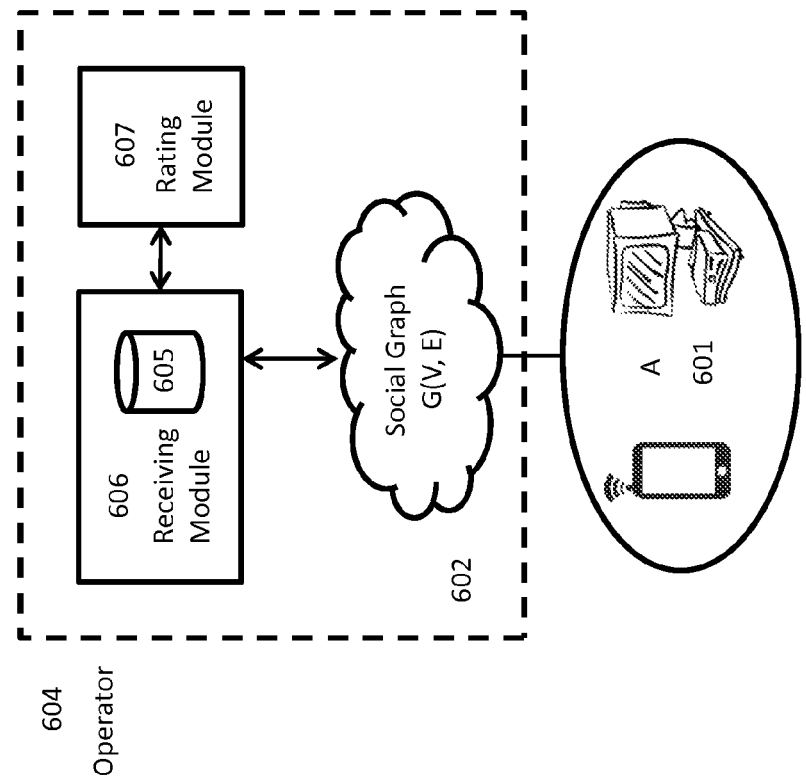
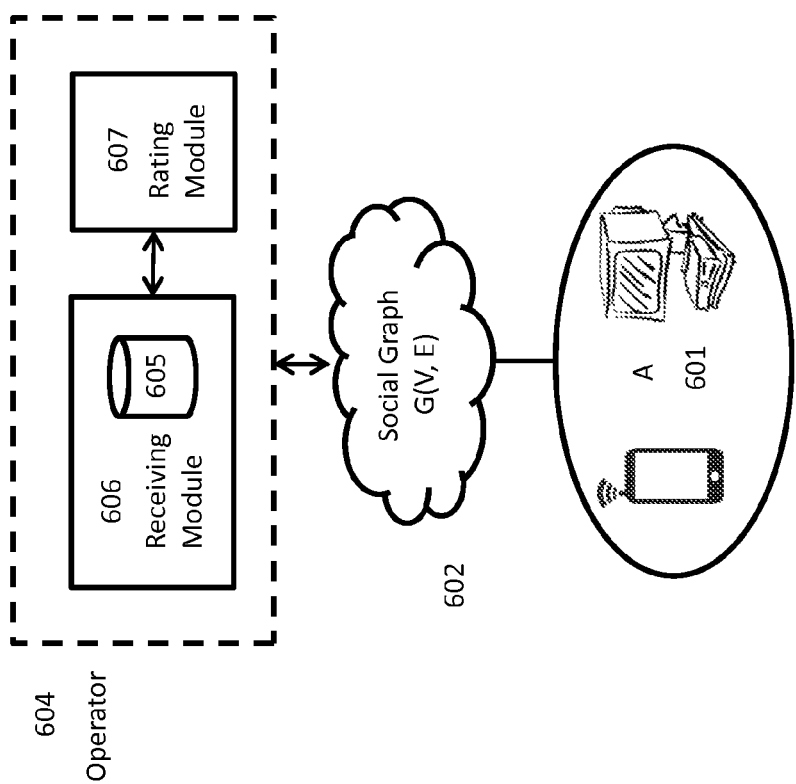
FIG. 6

| Network | Nodes | Links | Average degree |
|---|---|---|---|
| YouTube | 1.1 M | 5.8 M | 5.2 |
| Yelp Boston | 383 K | 890 K | 4.3 |
| Yelp San Francisco | 1.1 M | 3.9 M | 4.6 |
| Synthetic 1 | 10 K | 29 K | 5.6 |
| Synthetic 2 | 100 K | 280 K | 5.8 |
| Synthetic 3 | 600 K | 8.11 M | 26.8 |
| Synthetic 4 | 1 M | 12.3 M | 24.6 |

FIG. 7

| City | Yelp-Filtered | SumUp | Totals |
|---|---|---|---|
| Boston | 0.724 | 0.724 | 0.702 |
| San Francisco | 0.712 | 0.713 | 0.703 |

SYSTEMS AND METHODS FOR SECURING ONLINE CONTENT RATINGS

CROSS REFERENCE TO RELATED APPLICATIONS

This application claims priority under 35 U.S.C. §119(e) to U.S. Provisional Application Ser. No. 61/779,573 ("Securing Online Content Rating Systems and Related Methods"), filed Mar. 13, 2013, the entire contents of which are incorporated by reference herein.

STATEMENT REGARDING FEDERALLY SPONSORED RESEARCH OR DEVELOPMENT

This invention was made in part with government support under National Science Foundation (NSF) Grant No. IIS-0964465. The government has certain rights in this invention.

BACKGROUND OF THE INVENTION

Online content sharing services are a popular mechanism for users to find and share content. For example, certain sites share content such as business recommendations (e.g., Yelp, TripAdvisor), news articles (e.g., Digg, reddit), multimedia content (e.g., Flickr, YouTube), applications (apps) (e.g., iOS App Store, Google Play), and uniform resource locators (URLs) (e.g., StumbleUpon, del.icio.us). Generally, these sites allow users to create accounts, declare friendships, and upload and rate content. Unfortunately, the increasing popularity of online content sharing sites has made them an attractive target for manipulation. They are also experiencing an increasing level of malicious activity including multiple identity (Sybil) attacks. Manipulation of ratings can be undesirable for a site operator, whose reputation is negatively impacted by successful manipulation, including the "buying" of ratings from users, as well as honest end users, who depend on the site to locate relevant and trustworthy content.

SUMMARY

The systems and methods described herein relate to determining at least one weighted rating for a collector in a social network. In some embodiments, the system described herein include a receiving module configured to receive, at an operator, an identity of a collector, a list of raters, and a social graph, the operator including a gatherer of online ratings, the collector including a user in the social graph, the list of raters including at least one rater operably connected to the collector through the social graph, the at least one rater including a user who has left an online rating, and the social graph including a plurality of nodes and links, a link including a connection between a first node and a second node, the first node including a first user, and the second node including a second user; receive for the at least one rater a metric, the metric including a value corresponding to an online rating left by the at least one rater; and receive a path list for the at least one rater including at least one path from the at least one rater to the collector, a path including a list of nodes and links forming the connection between the at least one rater and the collector; and a rating module operably connected to the receiving module, configured to determine for the at least one rater a set of non-intersecting paths between the rater and the collector, and for each non-intersecting path, assign a unit capacity value to each link in the at least one non-intersecting path; calculate a capacity value for each link across all nonintersecting paths, and determine the link values that are overcapacity, an overcapacity link including a link with a capacity value greater than a unit capacity value; normalize path values including overcapacity links in order from the least-overcapacity to the most-overcapacity; add the normalized path values for each non-intersecting path corresponding to the at least one rater to determine the at least one rater's weight; and apply the at least one rater's weight to the at least one rater's rating. In some embodiments, the online rating comprises at least one of a number or portion thereof of stars, and a numerical score. In some embodiments, the metric further comprises at least one of an identity of the user and a content being rated. In some embodiments, the link comprises at least one of a mutual agreement between the first user and the second user to become friends, and a number of interactions between the first user and the second user exceed a threshold value.

In some embodiments, the method described herein comprises receiving, at an operator, an identity of a collector, a list of raters, and a social graph, the operator including a gatherer of online ratings, the collector including a user in the social graph, the list of raters including at least one rater operably connected to the collector through the social graph, the at least one rater including a user who has left an online rating, and the social graph including a plurality of nodes and links, a link including a connection between a first node and a second node, the first node including a first user, and the second node including a second user; receiving for the at least one rater a metric, the metric including a value corresponding to an online rating left by the at least one rater; receiving a path list for the at least one rater including at least one path from the at least one rater to the collector, a path including a list of nodes and links forming the connection between the at least one rater and the collector; determining for the at least one rater a set of non-intersecting paths between the rater and the collector, and for each non-intersecting path, assigning a unit capacity value to each link in the at least one non-intersecting path; calculating a capacity value for each link across all nonintersecting paths, and determining the link values that are overcapacity, an overcapacity link including a link with a capacity value greater than a unit capacity value; normalizing path values including overcapacity links in order from the least-overcapacity to the most-overcapacity; adding the normalized path values for each non-intersecting path corresponding to the at least one rater to determine the at least one rater's weight; and applying the at least one rater's weight to the at least one rater's rating.

Systems and methods are also described herein for determining a relative rating given by a rater for at least one item. In some embodiments, the system described herein include a receiving module configured to receive for the rater a rating for the first item, the rater including a user in a social network, the social network including a plurality of nodes and links, a link including a connection between a first node and a second node, the first node including a first user, and the second node including a second user; and receive a list of at least one additional item rated by the rater; and a rating module operably connected to the receiving module, configured to assign a relative rating to the first item equal to the received rating when the list does not include at least one other item, assign a relative rating to the first item when the list includes at least one other item rated by the rater, the rating module configured to receive a rating for each of the other items rated by the rater; order the items by rating from the lowest rating to the highest rating and assigning each item a number corresponding to the order; calculate a transformed rating for the first item including subtracting 0.5 from the order number of the first item and dividing the difference by the total number of ratings in the list; when the first item has the same rating as at least one other item, calculate a relative rating for the first item including averaging the transformed rating of items that share the same rating; and when the first item does not have the same rating as at least one other item, assign a relative rating for the first item equal to the transformed rating for the first item. In some embodiments, the online rating comprises at least one of a number or portion thereof of stars, and a numerical score. In some embodiments, the order the items from the lowest rating to the highest rating comprises a random sequence of order numbers for items with the same rating. In some embodiments, the link comprises at least one of a mutual agreement between the first user and the second user to become friends, and a number of interactions between the first user and the second user that exceed a threshold value.

In some embodiments, the method described herein comprises receiving for the rater a rating for the first item, the rater including a user in a social network, the social network including a plurality of nodes and links, a link including a connection between a first node and a second node, the first node including a first user, and the second node including a second user; receiving a list of at least one additional item rated by the rater; assigning a relative rating to the first item equal to the received rating when the list does not include at least one other item; assigning a relative rating to the first item when the list includes at least one other item rated by the rater, the method of assigning a relative rating comprising receiving a rating for each of the other items rated by the rater; ordering the items by rating from the lowest rating to the highest rating and assigning each item a number corresponding to the order; calculating a transformed rating for the first item including subtracting 0.5 from the order number of the first item and dividing the difference by the total number of ratings in the list; when the first item has the same rating as at least one other item, calculating a relative rating for the first item comprising averaging the transformed rating of items that share the same rating; and when the first item does not have the same rating as at least one other item, assigning a relative rating for the first item equal to the transformed rating for the first item.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

FIG. 5 illustrates a conversion of raw ratings to relative ratings, according to some embodiments of the present invention.

FIGS. 6(a)-6(b) illustrate an overview of the system, according to some embodiments of the present invention.

FIG. 7 illustrates statistics for social networks used to evaluate the system described herein, according to some embodiments of the present invention.

FIG. 12 illustrates the accuracy of different systems in predicting users' rankings of businesses, according to some embodiments of the present invention.

DETAILED DESCRIPTION

Figure 1:
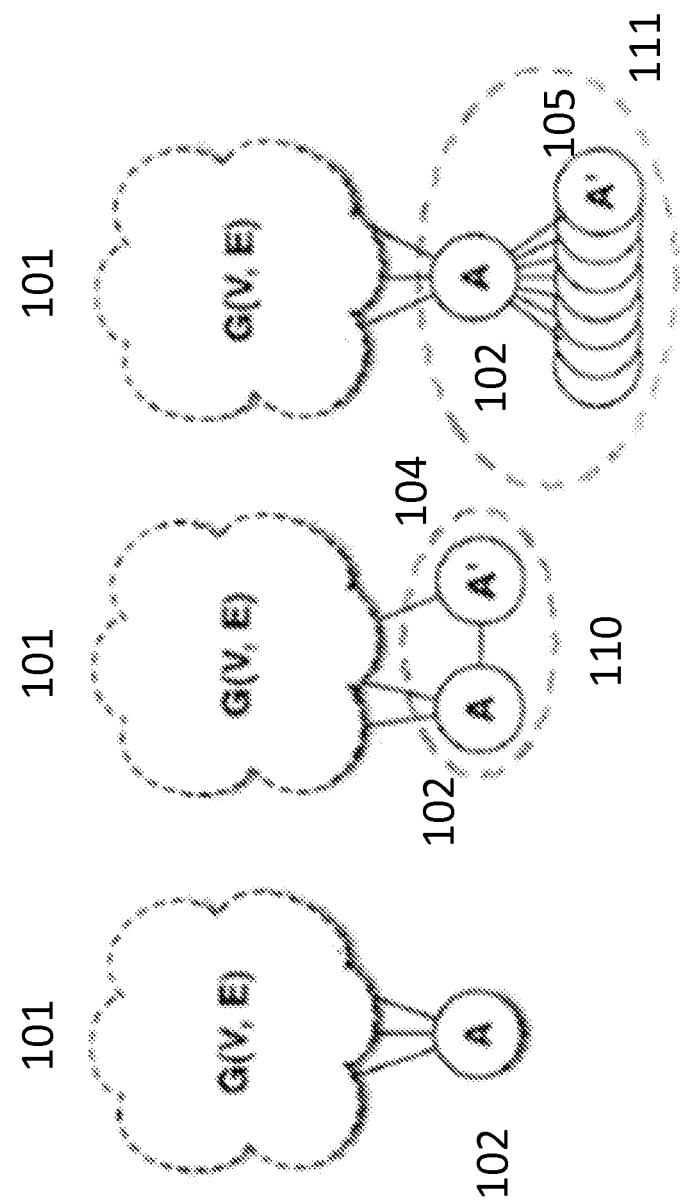
FIGS. 1(a)-1(c) illustrate a user of a social network conducting a Sybil attack, according to some embodiments of the present invention.

Online content sharing services are a popular mechanism for users to find and share content. For example, certain sites exist to share content such as business recommendations (e.g., Yelp, TripAdvisor), news articles (e.g., Digg, reddit), multimedia content (e.g., Flickr, YouTube), apps (e.g., iOS App Store, Google Play), and URLs (e.g., StumbleUpon, del.icio.us). Generally, these sites allow users to create accounts, declare friendships, and upload and rate content. The sites' popularity is evidenced by the massive amounts of content that are uploaded: YouTube receives over 72 hours of new video uploaded every minute, and Yelp boasts reviews on over 889,000 businesses worldwide. To locate relevant and trustworthy content from among this massive set of uploaded content, users are encouraged to rate content, with highly rated content receiving more prominent placement. The most highly rated content typically appears on the front page of the site or is listed more highly in search results, garnering significant attention and traffic.

Unfortunately, the increasing popularity of online content sharing sites has made them an attractive target for manipulation. For example, malicious users often attempt to ensure that their content is more highly ranked (or that others' content is more lowly ranked). On certain sites, such manipulation can have significant financial consequences: Recent studies have shown that increasing a business's overall rating on Yelp by one star can lead to 9% increase in revenue, explaining the numerous instances of rating manipulation that have been observed.

In general, manipulation on content rating sites can be enabled by two separate attacks:

Malicious users can create multiple identities (i.e., Sybils), and use these identities to provide positive ratings on their own content or negative ratings on others' content. This can be exacerbated by the fact that accounts are typically free to create, requiring only an email address and a solved CAPTCHA (an acronym for "Completely Automated Public Turing test to tell Computers and Humans Apart").

Malicious users can "buy" positive or negative ratings from otherwise legitimate users by offering small compensation in exchange for ratings. This is made worse by the fact that most content only receives a few ratings, making it possible to greatly influence the overall ranking with just a few additional ratings.

Such manipulation can be undesirable for the site operator (whose reputation can be negatively impacted by successful manipulation) as well as honest end users (who can depend on the site to locate relevant and trustworthy content).

It can be advantageous to have a system to diminish the effects of rating manipulation. In some embodiments, the system described herein can be run by a site operator. The site operator can use the system to mitigate the effect of rating manipulation via the creation of multiple identities or the "buying" of ratings. The system described herein can work using two techniques: weighing ratings and relative ratings. First, the system can leverage the structure of the social network to bound the influence over the overall rating that malicious users can achieve via the creation of multiple identities. The system can assign personalized weights to each rating, and select the weights using a multi-commodity max flow formulation. Doing so can ensure that the total weight of a single (human) user's ratings is bounded, regardless of the number of identities she creates.

Second, the system described herein can use the fact that most users provide few ratings to reduce the effectiveness of "buying" ratings. Instead of using a single rating directly as a raw score (e.g., content C gets three stars (★ ★ ★)), the system can transform the user's rating to a ranking relative to all of the user's other ratings (e.g., C is in the top 10% of content). Since most legitimate users provide few ratings, "buying" ratings from random users can provide significantly less benefits when using the system described herein.

Blocking Sybils

Previously, defenses against Sybil attacks rely on either trusted central authorities or tying identities to resources that are hard to obtain, such as social security numbers, mobile phones, or crypto-puzzles. There are two drawbacks to using existing Sybil defense schemes in content rating sites. First, existing schemes make the assumption that the honest region of the social network is densely connected with few internal small cuts (e.g., that the honest region is fast-mixing). Second, most pieces of content have few ratings. Allowing even a small number of fake identities into the system can allow an attacker to "control" the rating for many items.

Tolerating Sybils

Instead of trying to explicitly label identities as Sybil or non-Sybil, other approaches have focused on mitigating Sybil attacks in content rating services. Such systems are known as Sybil tolerant systems. For example, DSybil finds trusted users in the network (referred to as guides), and has provable optimality guarantees. However, DSybil can only provide recommendations for users who have submitted a sufficient number of ratings, which is often a small fraction of the population in practice. For example, in the Yelp data described below, only 15% of users have provided more than 5 reviews. Also, DSybil is designed for rating systems where objects can only be either good or bad.

SumUp is another Sybil tolerant system. SumUp uses tokens passed over the social network in order to determine whether users' votes will be counted. SumUp has three weaknesses that some embodiments of the system described herein addresses: First, SumUp assumes that the region of the social network surrounding the user requesting the vote (called the envelope) is free of malicious users; if a malicious user is nearby, they receive many tokens and can issue many votes. Second, outside of the envelope, SumUp allows manipulation by malicious users: Honest users with multiple links are only allowed to place a single vote, while malicious users who divide their attack links across multiple accounts can potentially place multiple votes. Third, SumUp was not designed to address the "buying" of ratings from otherwise honest users.

Detecting Fake Ratings

In some embodiments, the system described herein can use a variety of different inputs, including linguistic characteristics, user behavior, sets of recommended items, and common sets of user-reviewer pairs. While these techniques can detect certain rating manipulation, they rely on particular characteristics of malicious behavior. These techniques can be used in combination with some embodiments of the system described herein.

System Design

Some embodiments of the system described herein can be deployed by the operator of a content rating site, such as Yelp or Flickr. This entity shall be referred to as the operator. Some embodiments of the system can be designed to replace the existing content rating aggregation logic that the operator uses. Instead of taking the average or performing review filtering, the operator could instead query the system.

In some embodiments, the operator can collect ratings by a set of user accounts (referred to as identities) on a set of content objects. A user providing a rating on a given piece of content is referred to as a rater. Non-malicious users are assumed to provide honest ratings, with the exception of a small fraction of "bought" ratings.

In some embodiments, the operator can also provide the ability for users to declare "friends" and that friendship requires the approval of both parties. Many content rating services (e.g., Yelp, Flickr, YouTube) already have such a social network. In some embodiments, it is assumed that links to a non-malicious user take effort to form and maintain. In other words, a malicious user cannot obtain an arbitrary number of links to non-malicious users. In some embodiments, it is assume that each (human) user has a cut in the network between identities that she owns and identities owned by other (human) users. While a user can create identities and links on her side of the cut, she cannot unilaterally increase the size of her cut.

Input to the System

In some embodiments, an operator can provide the following inputs to the system:

Social network. In some embodiments, the system can take as an input the list of social links between the identities. In some embodiments, the social network is represented as an undirected graph $G=(V, E)$, and the graph is assumed to be connected.

Ratings. In some embodiments, the system also takes as input a set of user ratings, which can be represented by (identity, content, rating) tuples. In some embodiments, identity represents the user identity, content represents the content being rated, and rating represents the identity's rating.

System Overview

One goal of the system is to aggregate the ratings placed on content while ensuring that malicious users gain little additional influence by creating multiple identities or "buying" ratings. The system can provide the following advantages:

Personalized aggregation. Most existing content rating aggregate schemes provide a single, global, aggregated rating for each piece of content (e.g., a business is three stars (★ ★ ★) on Yelp). In some embodiments of the system, a personalized aggregated rating for each identity can be created. Such an approach can capture legitimate differences of opinion (content ratings are, after all, opinions), and certain sites already provide personalized content ratings (e.g., Digg, Netflix). The identity for whom the system is calculating the aggregate rating is known as the collector.

Weighing ratings. Existing approaches generally make a binary choice to either accept or reject each identity's rating when aggregating (e.g., Yelp's distinction between filtered and unfiltered reviews, SumUp's allowing or denying of votes). Instead, in some embodiments of the system, the system can weigh each identity's rating, and allow different identities to have different weights.

Relative ratings. Finally, existing approaches view ratings as absolute (e.g., content C gets three stars (★ ★ ★)). Given that most identities rate few objects, this approach does not consider the amount of information each rater has provided (e.g., an identity who has only rated a single piece of content "counts" the same as an identity who has rated hundreds). In some embodiments of the system, raw ratings can be transformed into relative ratings before aggregation.

Mitigating Sybil Attacks

In some embodiments described herein, the system can defend against multiple identity (Sybil) attacks through the weighing of ratings. Consider the set of raters $R \subseteq V$ on a single content object. Instead of taking the average of all ratings to be the aggregate rating, the system can use a weighting function $\omega(r) \to (0, \infty)$ that assigns a positive weight to every rater $r \in R$. The aggregated rating can be the weighted average of these ratings as shown in Equation 1 below $$\frac{\sum_{r \in R} w(r) \cdot v_r}{\sum_{r \in R} w(r)}$$

where $v_r$ is the rating of rater r. For existing systems which weigh all ratings equally, $\omega(r)=1$ for all r.

In some embodiments, a weighting function is selected that limits the ability for malicious users to gain additional aggregate weight through Sybil attacks (where a user's aggregate weight is the total weight of the subset of her identities in R). In some embodiments, a weighting function is also selected that assigns a non-zero weight to all identities.

Sybil Attack

For example, suppose that a malicious user controls a set of identities $I \subset V$. A cut (I, V\I) would be labeled as the attack cut (and the links along the cut as attack links), as these links signify links between the malicious user and identities controlled by other users. The number of attack links is bounded, but the number of identities in I and the number of links between these identities are unbounded. As a result, a malicious user is able to perform three actions as part of a Sybil attack, as depicted in FIGS. 1(a)-(c).

FIGS. 1(a)-(c) illustrate three methods a user of a social network can use to conduct a Sybil attack, according to some embodiments of the present invention. A social network can be illustrated using a social graph. A social graph can comprise a set of vertices or nodes ("V"), and a set of links or edges ("E"). A social graph can be designated G(V, E), which can represent the set of nodes and edges in the social graph.

FIG. 1(a) illustrates a user, A 102, connected to a social network 101. The social network is represented by a social graph, G(V, E) 101. A malicious user is allowed to create any number of identities within the social network.

FIG. 1(b) illustrates a user conducting a Sybil attack by splitting her identity 110. A 102 splits her identity by creating a second identity, A' 104. A' 104 is also connected to the social network. In some embodiments, A' 104 can be connected to G(V, E) 101 through an independent link. In some embodiments, A' 104 is connected to G(V, E) 101 through an independent link and through a link connected to A 102. In some embodiments, user A can conduct a Sybil attack by providing ratings from both her original identity, A 102, and her second identity A' 104.

FIG. 1(c) illustrates A 102 conducting a Sybil attack by creating a Sybil cluster. A 102 can create a number of identities A' 105, and link an arbitrary number of identities A' 105 to the social network through A 102. Each of the identities A' 105 can leave a rating through their connection to A 102.

Sybil-Proof

FIGS. 2(a)-(c) illustrate how a user can split her identity, according to some embodiments of the present invention.

FIG. 2(a) illustrates a social graph consisting of three nodes, which include a VC 201 and two raters, V1 210 and V2 211. The collector, VC 201, can comprise the identity for whom the system calculates an aggregate rating. The raters 210 211 can comprise users connected to the collector through the social network who have provided ratings.

FIG. 2(b) illustrates a social graph as illustrated in FIG. 2(a), with the addition of a legitimate third rater, V3 212.

FIG. 2(c) illustrates a social graph as illustrated in FIG. 2(b), where the third rater 212 is a split identity of a second rater 210. As discussed above, split identity can imply that the same user controls both V3 and V1.

In some Sybil-defense systems, it is desired to have a weighting function that is Sybil-proof meaning the weighting function ensures that a malicious user can gain no additional aggregate weight by conducting a Sybil attack. For example, assume that there are social networks G and G', where G' is the same as G except that malicious user A has conducted any number of Sybil attack actions. For example, G and G' may be the graphs shown in FIG. 1 (a) and FIG. 1 (b) or (c). A Sybil-proof rating system would ensure that the aggregate weight assigned to raters that A controls is the same in both G and G'.

Unfortunately, Sybil-proof weighting functions on real-world networks are forced to be trivial, meaning they assign a weight of 0 to all raters that have multiple distinct paths to the collector (which, in practice, is almost all raters).

Figure 2:
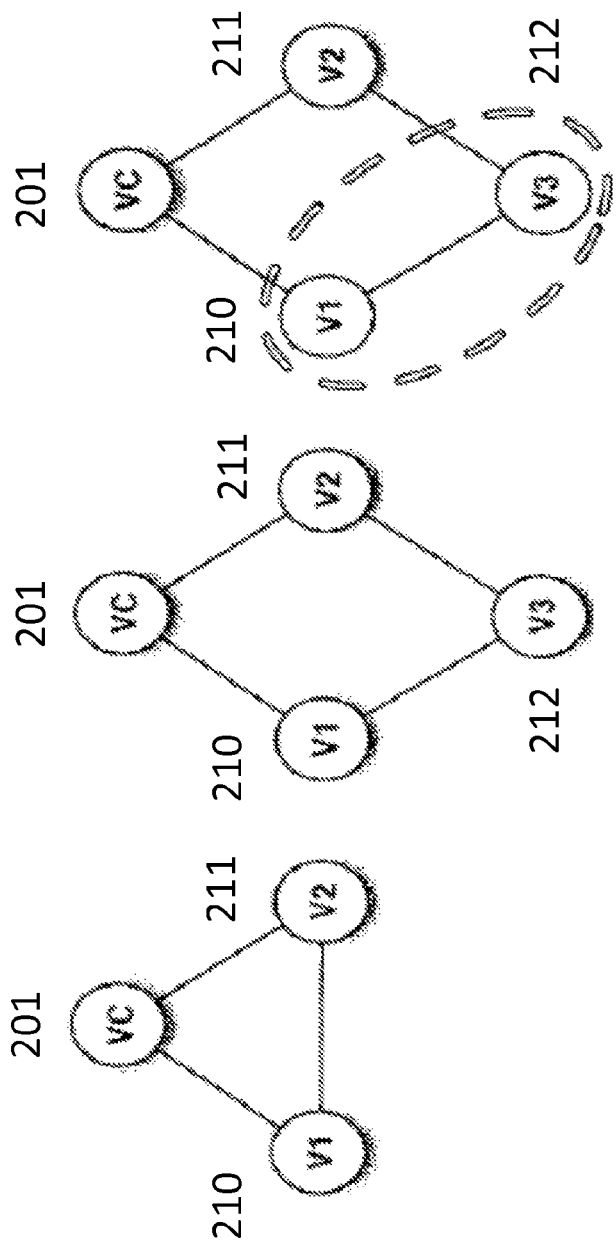
FIGS. 2(a)-2(c) illustrate how a user can split her identity, according to some embodiments of the present invention.

Consider in FIGS. 2(a)-(c) rater V3 212, who has two distinct paths to VC 201. V3 212 could be (a) a legitimate, non-malicious identity, (b) part of a Sybil attack by rater V1 210, who splits her identity when linking to V2 211 as shown in FIG. 2 (c), or (c) part of a Sybil attack by rater V2 211, who splits her identity when linking to V1 210. In either of the latter cases, each of V1 210 and V2 211 should get the same (aggregate) weight as in the network shown in FIG. 2 (a). Thus, any weighting function that is Sybil-proof must assign V3 212 a weight of 0.

As a result, requiring a weighting function to be Sybil-proof can preclude non-trivial weighting functions in practice.

Sybil-Bounded

A Sybil-bounded weighting function is one where, given a social network G and malicious user A, there exists a bound BA>0 such that under any Sybil attack by A, the aggregate weight received by A's raters is always less than BA. In other words, a malicious user may be able to get some additional weight through Sybil attacks, but there exists a bound on the total weight the malicious user will be able to receive, regardless of the number of identities A creates.

Compared to a Sybil-proof weighting function, a Sybil-bounded weighting function is weaker because malicious users can gain additional weight via Sybil attacks. However, in some embodiments, the system described herein can employ a weighting function that has tight bounds (leaving little additional weight to be gained via Sybil attacks).

Using Max Flow

In some embodiments, the system described herein addresses the problem of assigning weights with multi-commodity max flow. The system can view the social network as a graph with all links having unit capacity, and with the raters each sourcing a different flow, and with the collector serving as all flows' sink. The amount of flow that each rater is able to source can be taken in as that rater's weight.

The maximum flow between any two sets of nodes can be defined by the minimum cut in the graph between the source and sink. The attack links can represent such a cut, implying that the total flow—and therefore total weight—of the attacker is bounded, since the size of the attack cut is bounded. Thus, regardless of how the malicious user conducts a Sybil attack, the aggregate weight of the attacker's ratings is bounded.

Moreover, using multi-commodity max flow can also ensure that multiple malicious users gain no benefit from collusion. For example, suppose that there are two malicious users. Without collusion, the two are each bounded by their respective set of attack links. Should the users collude, they are bounded by the union of their attack links.

Ensuring Tight Bounds

The presence of bounds can limit the potential impact of a Sybil attack. In some embodiments, the bounds are tight. In some embodiments, the goal is to minimize the difference between the assigned weights and the bound. Doing so can ensure that the malicious users can gain the least amount of weight by creating additional identities. In some embodiments, the system can use an approximation of max flow which results in an even distribution of capacity between raters and provides tight bounds on Sybil attacks.

Determining Weights

In some embodiments, for each rater r∈R, the system can determine the max flow between r and the collector (ignoring all other raters), and can derive a set of non-intersecting paths $P_r$ for this flow. When multiple options for $P_r$ exist, the system can select arbitrarily between them. Next, the system can consider the graph where all raters attempt to send 1 unit of flow along each of their paths. For example, for all r in R, each path in $P_r$ is initially assigned weight 1. Since all links have unit capacity, there may be certain links that are over capacity (e.g., multiple raters have paths using that link). To resolve these situations, the system can normalize the flow along these links by reducing the amount of flow proportionally. If a link is used by raters $\{r_1, r_2, \ldots r_n\}$ with weights $\{w_1, w_2, \ldots w_n\}$, each $w_i$ is normalized as shown in $$w'_i = \frac{w_i}{\sum_{j=1}^{n} w_j}  \qquad \text{Equation 2}$$

where $w'_i$ represents the value of $w_i$ after normalization.

In some embodiments, the system can normalize links from the least-overcapacity to the most-overcapacity. Doing so can ensure that malicious users are first bottlenecked at their attack cut before affecting any non-malicious users. All of the paths begin at a rater but end at the single collector. Thus, the highest bottlenecks occur around the collector; links away from the rater are less likely to be over capacity.

FIGS. 3(a)-(e) illustrate a method of calculating weights for branches in a social network, according to some embodiments of the present invention.

FIG. 3(a) illustrates an example of a social graph received by the system. FIG. 3(a) shows a social network with collector, VC 301, and raters A 310, B 311, D 312, and E 313, and non-rater C 320. The collector, VC 301, can comprise the identity for whom the system calculates an aggregate rating. Raters A 310 and B 311, and non-rater C 320 are connected directly to the collector 301. Rater D 312 is connected to the collector 301 along two paths, through B 311 and through C 320. Rater E 313 is connected to the collector through Rater D 312.

In addition to receiving a social graph, the system can also receive a set of user parameters comprising identity of the user, content comprising the content being rater, and a rating comprising the identity's rating. For example, in FIG. 3(a), the system receives a set of user parameters for each of users A 310, B 311, D 312, and E 313. In some embodiments, an identity's rating can comprise at least one of a number or portion thereof of stars, and a numerical score.

FIG. 3(b) shows an example of how the system determines non-intersecting paths between each rater 311 312 313 and the collector 301. In some embodiments, a path is non-intersecting if it does not use the same node as another path. For example, there is only one non-intersecting path from A 310 to VC 301 because there is only one path from A 310 to VC 301. Similarly, there is only one non-intersecting path between B 311 and VC 301. There are two non-intersecting paths between D 312 and VC 301. D 312 is connected to VC 301 through B 311 and connected to VC 301 through C 320. E 313 has two intersecting paths to VC 301. The E-D-B-VC path and the E-D-C-VC path both go through node D 312. In some embodiments, when there are at least two intersecting paths, the system can randomly select one of the intersecting paths. In FIG. 3(b), the system chooses the E-D-B-VC path.

FIG. 3(b) also shows an example of assigning a unit capacity value to each link in the paths between A 310 and VC 301, B 311 and VC 301, D 312 and VC 301, and E 313 and VC 301. In some embodiments, every branch or link in a received social graph can be assigned a unit capacity value.

FIGS. 3(c) and 3(d) show path weights after normalizing the least-overcapacity link to the over-capacity link. In some embodiments, the system normalizes links from the least-overcapacity to the most-overcapacity.

In some embodiments, an overcapacity link comprises links that have a capacity value greater than a unit capacity value. In some embodiments, to determine which links are overcapacity, the system adds together the number of times a link appears across all paths. For example, the total capacity value of the A-VC link, B-VC link, C-VC link, the D-C link and the E-D link equals 1 because each of those links only appear once across all paths. In some embodiments, the A-VC link, C-VC link, the D-C link and the E-D would not be considered overcapacity. The total capacity value for the D-B link equals 2 because it appears once in the D-VC path and once in the E-VC path. The total capacity value for the B-VC link equals 3 because it appears once in the B-VC path, once in the D-VC path, and once in the E-VC path. Both the D-B link and the B-VC link are overcapacity. The D-B link is the least overcapacity link and the B-VC link is the most overcapacity link.

FIG. 3(c) shows path weights after normalizing the least overcapacity link, D-B. In some embodiments, normalizing an overcapacity link can include dividing the overcapacity link by an amount that the link is overcapacity. For example, D-B has a total capacity value of 2. To normalize D-B, the system divides all of the paths that contain a D-B link by 2. After normalizing the D-B link, the D-B link and B-VC link in the D-VC path each have a link weight of ½. Similarly, the E-D link, the D-B link, and the B-VC link in the E-VC path also each have a weight of ½.

FIG. 3(d) shows path weights after normalizing the B-VC link. After normalizing the D-B link, the link weight of B-VC in the B-VC path is 1, the link weight of B-VC in the D-VC path is ½, and the link weight of B-VC in the B-VC path is ½. After normalizing the D-B link, the B-VC capacity value equals 2. To normalize B-VC, the system divides all of the paths that contain a D-B link by 2. After normalizing the D-B link, the D-B link and the B-VC link in the D-VC path each have a link weight of ¼. Similarly, the E-D link, the D-B link, and the B-VC link in the E-VC path also each have a weight of ¼.

FIG. 3(e) shows the final weights for each rater. In some embodiments, after overcapacity links are normalized, the system can determine a final path weight. The final path weight comprises the sum of the path weights along each non-intersecting path. For example, because the A-VC, B-VC and E-VC paths each have only one non-intersecting path, the final path weight is the weight of those paths, respectively. A-VC has a path weight of 1, B-VC has a path weight of ½, and E-VC has a path weight of ¼. For D-VC, the path weights of the two non-intersecting paths are added to give a total path weight of 1¼. In some embodiments, the final weights of the raters comprise the corresponding path weights between each user and the collector.

Figure 4:
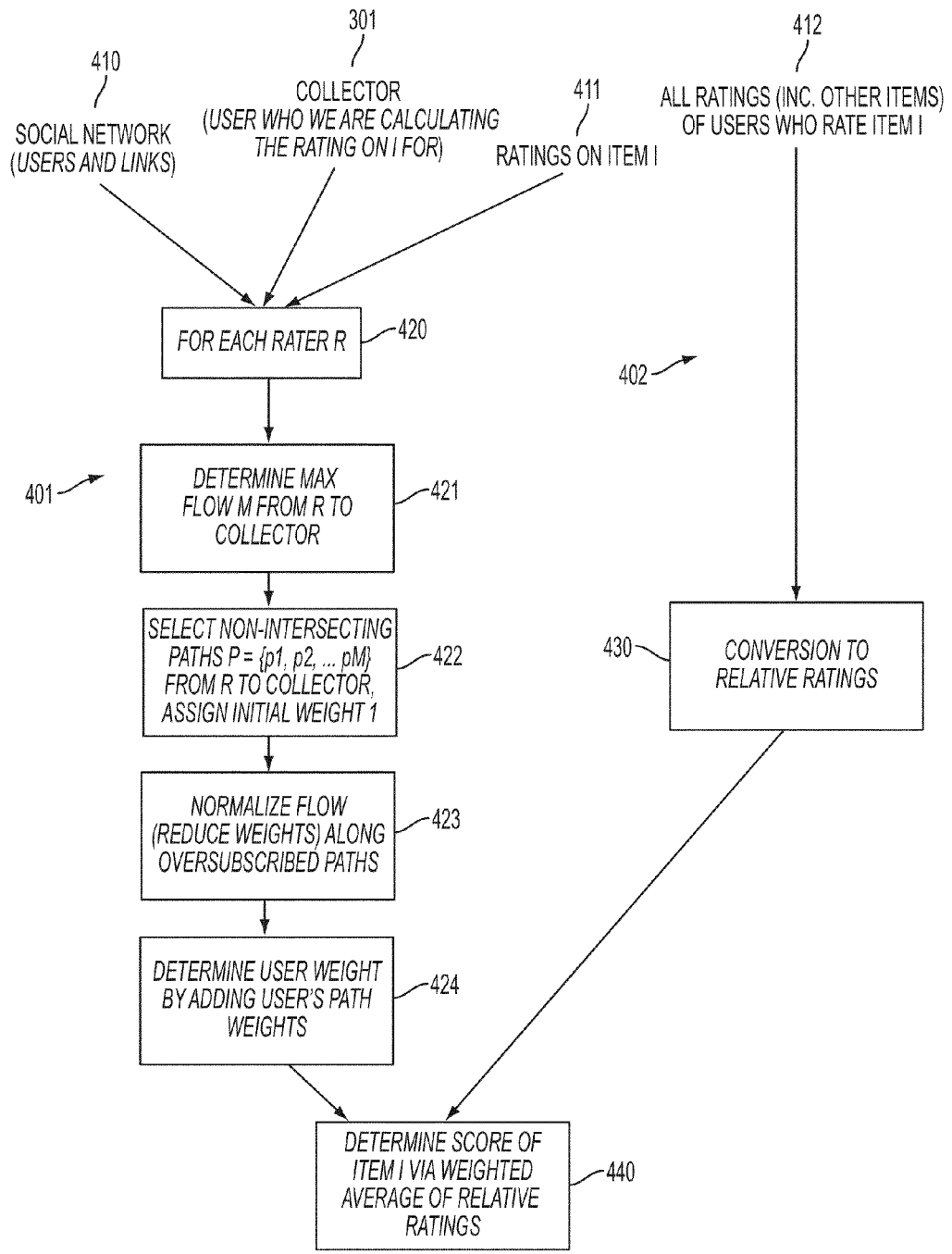
FIG. 4 illustrates a flowchart for determining a score of an item by calculating at least one of a weighted average and a relative rating, according to some embodiments of the present invention, according to some embodiments of the present invention.

FIG. 4 illustrates a flowchart for determining a score of an item by calculating at least one of a weighted average and a relative rating, according to some embodiments of the present invention. In some embodiments, determining a score for an item comprises determining a user weight 401 and determining a relative rating 402.

In some embodiments, determining a user weight 401 can comprise receiving a set of parameters for each rater 420, determining a max flow from each rater to the collector 421, selecting non-intersecting paths from each rater to the collector 422, assigning branches of the non-intersecting paths a unit value, 1 422, normalizing flow along oversubscribed paths 423, and determining a user weight by adding a user's path weights 424.

Figure 3:
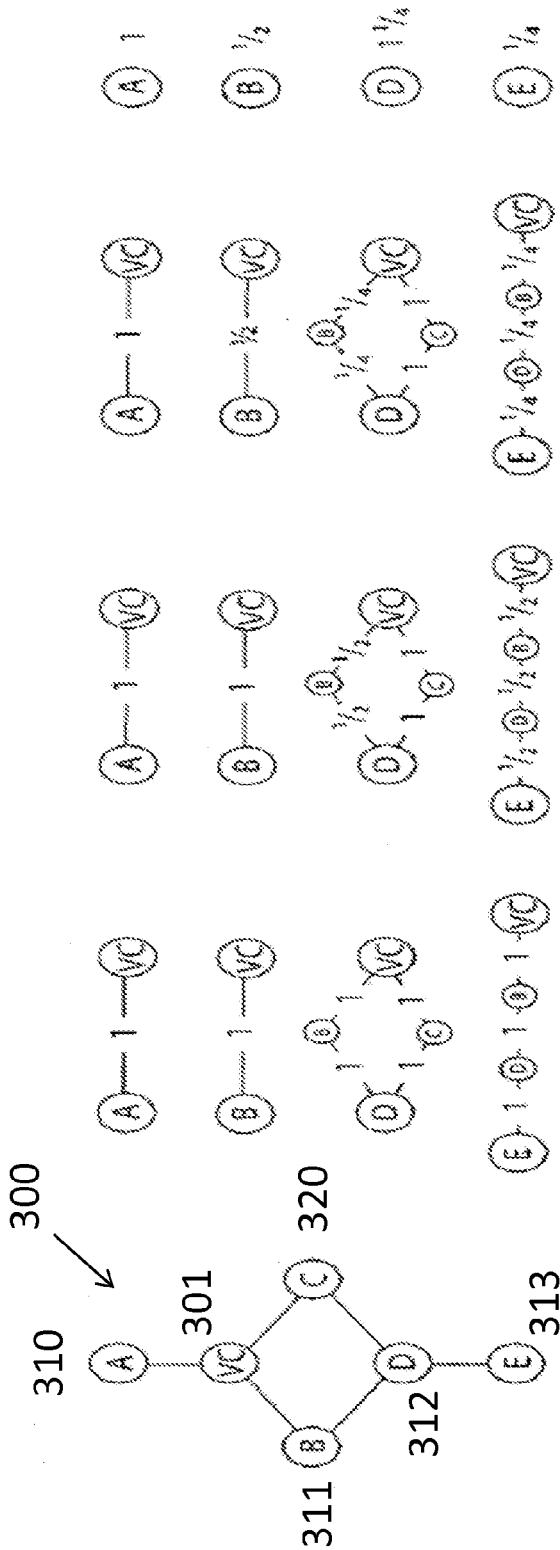
FIGS. 3(a)-3(e) illustrate a method of applying weights to branches in a social network, according to some embodiments of the present invention.

In some embodiments, to determine a user weight, the system first receives a set of parameters for each rater 420. The parameters comprise a social network 410, a collector 301, and ratings for an item 411. A social network 410 comprises a series of nodes and links. Nodes can represent users and links can represent connections between the users. In some embodiments, a link between two users can represent a mutual agreement between the two users to become friends. In some embodiments, a link between users can represent a number of interactions between two users that exceed a threshold value. An example of a social network is a social graph 300 as shown in FIG. 3(a). A collector 301 comprises a user for whom the system calculates an aggregate rating. An example of a collector is VC 301 in FIG. 3. The ratings for an item I 411 comprise the rating for item I given by each rater in the social network.

In some embodiments the next step in determining a user weight comprises determining a max flow from the rater to the collector 421. Determining a max flow can comprise determining all paths from a rater to the collector. For example, in FIG. 3, the max flow from rater E 313 to the collector 301 comprises the E-D-B-VC path and the E-D-C-VC path.

In some embodiments, the next step in determining a user weight comprises selecting non-intersecting paths from each rater to the collector 422. In some embodiments, a path is non-intersecting if it does not use the same node as another path. For example, in FIG. 3(a), there is only one non-intersecting path from A 310 to VC 301 because there is only one path from A 310 to VC 301. Similarly, there is only one non-intersecting path between B 311 and VC 301. There are two non-intersecting paths between D 312 and VC 301. D 312 is connected to VC 301 through B 311 and connected to VC 301 through C 320. E 313 has two intersecting paths to VC 301. The E-D-B-VC link and the E-D-C-VC link both go through node D 312. In some embodiments, when there are at least two intersecting paths, the system can randomly select one of the intersecting paths. In FIG. 3(b), the system chose the E-D-B-VC path.

In some embodiments, after the system determines non-intersecting paths, the system can assign an initial weight of 1 to each branch 422. FIG. 3(b) also shows an example of assigning a unit capacity value to each link in the paths between A 310 and VC 301, B 311 and VC 301, D 312 and VC 301, and E 313 and VC 301. In some embodiments, every link in a received social graph can be assigned a unit capacity value.

In some embodiments, after the system assigns an initial weight of 1 to each link, the system can normalize the flow along oversubscribed paths 423. The system can normalize the flow along oversubscribed paths from least over-capacity to most over-capacity.

In some embodiments, an overcapacity link comprises a link that has a capacity value greater than the unit capacity value. In some embodiments, to determine which links are overcapacity, the system adds together the number of times a link appears across all paths. For example, in FIG. 3(b), the total capacity value of the A-VC link, C-VC link, the D-C link and the E-D link equals 1 because each of those links only appear once across all paths. In some embodiments, the A-VC link, C-VC link, the D-C link and the E-D would not be considered overcapacity. The total capacity value for the D-B link equals 2 because it appears once in the D-VC path and once in the E-VC path. The total capacity value for the B-VC link equals 3 because it appears once in the B-VC path, once in the D-VC path, and once in the E-VC path. Both the D-B link and the B-VC link are overcapacity. The D-B link is the least overcapacity link and the B-VC link is the most overcapacity link.

In some embodiments, the system can normalize the capacity by reducing the weight of each overcapacity link to 1. In some embodiments, the system can normalize overcapacity links starting with the least overcapacity link and ending with the most overcapacity link. For example, in FIG. 3(b), the system would first normalize the paths with a D-B link, which has an initial capacity value of 2. The system would then normalize the paths with a B-VC link, which has an initial capacity value of 3. In some embodiments, some paths have an adjusted weight after normalization.

In some embodiments, the next step can comprise determining a user weight by adding a user's path weight corresponding to each rater 424. The final path weight for each user comprises the sum of the path weights along each non-intersecting path.

In some embodiments, in addition to determining a user weight for each user, the system can also calculate a relative rating for each user 412. The first step in determining relative ratings can comprise receiving all ratings, including of other items, for a rater who rates a particular item, I. For example, suppose rater A has provided a rating for item I, and has also provided ratings for items J, K, L, and M. The system would receive the ratings for rater A of items I, J, K, L and M.

To transform a rater's raw rating to a relative rating, the system can consider all of that rater's ratings on other content objects. In some embodiments, the relative rating is the ranked score (between 0 and 1) relative to all of the rater's other ratings. For example, consider a rater who provides a five star rating such as ★ ★ ★ ★ ★ for content object c1 and two stars (★ ★) for content objects c2 and c3. The rater ranks c1 higher than two other content objects and c1 is in the "top third" of content objects for this rater. The relative rating for c1 is therefore the midpoint of the top third of objects: 0.833 (the midpoint of [0,66.1]). Similarly, the rater ranks content objects c2 and c3 in the "bottom two-thirds" of content objects. The system cannot determine which content the c2 or c3 the rater ranked higher. Thus, the relative rating of c2 and c3 are both assigned to 0.333 (the midpoint of [0,0.66]).

For example, suppose that a rater provides raw ratings $\{r_1, r_2, \ldots r_n\}$ on content objects $\{c_1, c_2, \ldots c_n\}$. For simplicity, assume these are sorted by $r_i$. Each content object $c_i$ can be assigned the relative rating as shown in Equation 3

$$\frac{i - 0.5}{n}$$

with the exception that any set of content objects that have the same raw rating are then assigned the average of all relative ratings with the same raw rating. In some embodiments, a rating can comprise a number of starts. In some embodiments, a rating can comprise a numerical score.

FIG. 5 shows an example of converting raw ratings for three different users, according to some embodiments of the present invention. For user two ($r_2$), the system first receives five items the user has rated. The system next orders the five ratings corresponding to the five items from lowest rating to highest rating. In some embodiments, if the rating is the same for a number of items, the system selects at random the ordering of the items with the same rating. The item rated with one star ($r_{2,1}$), the lowest rating, receives an order number of 1. The item with two stars ($r_{2,2}$), the second lowest rating, receives an order number of 2. The item with three stars ($r_{2,3}$), the third lowest rating, receives an order number of 3. The two items with five stars ($r_{2,4}$) ($r_{2,5}$), the two highest ratings, receive an order number of 4 and 5, respectively. The system can select at random the sequence of items ($r_{2,4}$) and ($r_{2,5}$), e.g., either item ($r_{2,4}$) or ($r_{2,5}$) can be assigned order number 4 and order number 5. In some embodiments, the sequence of ($r_{2,4}$) and ($r_{2,5}$) can be switched. The system next computes a transformed rating comprising taking the order number, subtracting it by 0.5 and dividing the difference by the total number of items rated. For ($r_{2,1}$), the transformed rating equals $(1-0.5)/5=0.1$. For ($r_{2,2}$), the transformed rating equals $(2-0.5)/5=0.3$. For ($r_{2,3}$), the transformed rating equals $(3-0.5)/5=0.5$. For ($r_{2,4}$), the transformed rating equals $(4-0.5)/5=0.7$. For ($r_{2,1}$), the transformed rating equals $(5-0.5)/5=0.9$. The system next calculates a relative rating for each of the five items. ($r_{2,1}$), ($r_{2,2}$), and ($r_{2,3}$) do not share the same rating with any other item; therefore, their relative ratings equal their transformed ratings. As shown in FIG. 5, the relative and transformed ratings for ($r_{2,1}$), ($r_{2,2}$), and ($r_{2,3}$), respectively, are the same. ($r_{2,4}$) and ($r_{2,5}$) have the same rating; therefore, the system averages their transformed ratings, $(0.7+0.9)/2$, which equals 0.8.

In some embodiments, after the system determines a path weight and a relative rating for each user, the system can output a weighted average of relative ratings 440. In some embodiments, the system can multiply the relative rating by the path weight to generate the weighted average.

In some embodiments, the two parts of the system can work together to strengthen content rating sites. The use of max flow-based techniques ensures that users gain little benefit from creating multiple identities. The use of relative ratings reduces the effectiveness of "buying" positive ratings from random users, who generally do not have a significant, rating history.

FIGS. 6(a)-6(b) illustrate an overview of the system described herein, according to some embodiments of the present invention. FIGS. 6(a)-6(b) illustrate an operator 604, a rating module 607, a receiving module 606, a database 605, a social network 602 and a user 601.

In some embodiments, the rating module 607 is operatively connected to the operator 604. In some embodiments, the rating module 607 may reside within the operator 604.

In some embodiments, as shown in FIG. 6(b), the operator 604 deploys a social network 602 that a user (e.g., A 601) can join. In some embodiments, as shown in FIG. 6(a), the operator 604 can operatively connect to an already existing social network 602. In some embodiments, the rating module 607 can derive a social network 602 if one already does not exist. In some embodiments, a user 601 can be operatively connected to the social network through any device capable of connecting to the internet (e.g., computer, mobile phone).

In some embodiments, the receiving module 606 can include a database 605. The database 605 can also reside outside of the receiving module 606. The database 605 can be operably connected to both the receiving module 606 and the rating module 607. In some embodiments, the receiving module 606 can receive and store information regarding users and user relationships in the social network. The receiving module 606 can also receive and store a graph of nodes and links. The receiving module 606 can also receive and store for each user a user identity, content being rated, and a value of the rating. In some embodiments, the receiving module 606 can receive all of the items and corresponding ratings that were rated by a user (e.g., 601).

In some embodiments, the receiving module 606 and the rating module 607 can comprise one or more processors. In some embodiments, the receiving module 606 is configured to control the processor to locate and receive social graph information. In some embodiments, the rating module 607 is configured to control the processor to calculate ratings. In some embodiments, the receiving module 606 comprises a non-transitory computer readable medium storing instructions for controlling a computer device to perform the steps of locating and receiving social graph information. In some embodiments, the rating module 607 comprises a non-transitory computer readable medium storing instructions for controlling a computer device to perform the steps of calculating ratings.

Deployment

Underlying network. The system assumes existence of an underlying social network. Most services either directly have the social network or allow users to import their friends from other social networks such as Facebook and Twitter.

Disconnected users. The system assumes that the underlying social network is a connected graph. In some embodiments, in order to allow users who are not connected in the social network (e.g., guest users), the system could be modified to create a "virtual" account for the user, with random links placed temporarily to allow rating calculation.

Rating interpretation. Due to the use of relative ratings, the final ratings calculated by the system can be real-valued numbers between 0 and 1. A potential concern can be how users interpret such values. In some embodiments, this range can be mapped to any desirable range by a percentile conversion (e.g., the top 15% of content items receive five stars (★ ★ ★ ★ ★)). Additionally, the ratings in the system described herein can be personalized (e.g., different users may see different rankings for the same content object).

Impact on non-malicious users. As addressed below, the system does not adversely impact the rankings for non-malicious users.

Implementation

The system described herein can be implemented in C++ and Python. The implementation can be divided into two parts: one that locates paths in the social network, and one that uses those paths and the rating history to calculate the rating.

Finding multiple, disjoint paths between nodes in a large social network can be expensive, and naive implementations can result in poor scalability. In one embodiment, Canal, a program that approximates credit payments in large credit networks, can be used. Canal uses landmark routing-based techniques to locate disjoint paths in large networks. Canal can be modified to disable the credit transactions, and only used to quickly find paths. Other programs that can locate disjoint paths in large networks can also be used.

The remainder of the system implementation can consist of code that interacts with a program like Canal. In some embodiments, the code can facilitate the calculation of weights, and transformation of raw ratings into relative ratings. The code can be implemented in Python, or other comparable program.

Experimental Setup

To evaluate the system, both real-world social networks and synthetic social networks of varying sizes were used, according to some embodiments of the present invention.

FIG. 7 shows statistics of networks used for evaluation, according to some embodiments of the present invention. The synthetic networks are generated using nearest neighbor method, with prescribed number of nodes, probability of adding new nodes, and number of random pairs connected. The resulting networks have been shown to have characteristics close to real-world social networks.

The real-world social networks come from two large content rating sites: YouTube and Yelp. The social network of YouTube users was originally used in a SumUp evaluation. SumUp is another Sybil tolerant system. SumUp uses tokens passed over the social network in order to determine whether users' votes will be counted. As discussed above, SumUp has three weaknesses that this system addresses: First, SumUp assumes that the region of the social network surrounding the user requesting the vote (called the envelope) is free of malicious users; if a malicious user is nearby, they receive many tokens and can issue many votes. Second, outside of the envelope, SumUp allows manipulation by malicious users: Honest users with multiple links are only allowed to place a single vote, while malicious users who divide their attack links across multiple accounts can potentially place multiple votes. Third, SumUp was not designed to address the "buying" of ratings from otherwise honest users. As shown below, the system described herein addresses these drawbacks and outperforms SumUp on real-world data.

Data was also collected from Yelp containing both social network information and content ratings from two cities: Boston and San Francisco. First, the set of all businesses on Yelp located within the each city was determined. This totaled 9,228 businesses in Boston and 30,339 in San Francisco. Then, all ratings on these businesses were collected. This totaled 278,719 ratings from 82,846 users in Boston and 1,655,385 ratings from 340,671 users in San Francisco. Finally, all of the social connections of these users were collected. This resulted in a network of 383,557 users connected together with 888,335 links in Boston and 1,111,254 users and 3,920,553 links in San Francisco.

As the system assumes that the social network is a connected graph in some embodiments, only users located in the largest connected component (LCC) of each Yelp graph were considered. A connected component is a set of nodes where there are paths from every node to the other. Given a graph, an LCC is a connected component with the most nodes. The LCC encompasses the vast majority of the data: In Boston, it covers 327,515 (85.3%) users connected by 883,179 (99.4%) links and providing 190,042 (68.1%) ratings. In San Francisco, it covers 1,303,086 (82.7%) users connected by 3,912,279 (99.8%) links and providing 1,303,086 (78.7%) ratings.

Simulating Sybil attacks. Sybil attacks were simulated by injecting malicious nodes and adding attack links (e.g., links from malicious nodes to non-malicious nodes). Non-malicious nodes that are linked to by malicious users can be known as attacked nodes. In some embodiments, there are three different attack strategies for selecting attacked nodes:

Random. Attacked nodes are chosen randomly.

k-closest. Attacked nodes are chosen randomly among the k closest nodes (by hop distance, e.g., the minimal length of path connecting two nodes) to the collector. This represents a targeted attack on a particular collector.

k-highest. Attacked nodes are chosen randomly from among the k highest degree nodes in the network. This represents the most effective attack for being "close" for many collectors. A smaller k implies that the attacker can better target her attack (e.g., a small k in k-closest implies the attacker is able to obtain attack links very close to the collector).

Simulating "bought" ratings. The "buying" of ratings was also simulated by malicious businesses in Yelp. Random non-malicious users were selected to provide "bought" ratings. Each one of these users was simulated to provide one additional highly positive rating on the Yelp business that was trying to manipulate the ratings.

Comparing against SumUp. The performance of the system described herein was compared to SumUp. For SumUp, the original code was used and configured to default values. SumUp was run with $\rho=0.5$ and 20 non-greedy steps.

Microbenchmarks

In some embodiments, the system described herein is designed to be parallelized. It can be configured to use multiple cores, and distributed across multiple machines, to speed up computation time. The system was evaluated by deployment to a single machine with dual 8-core hyper-threaded Intel Xeon 2.1 GHz CPUs and 128 GB of memory.

Using the different networks, a single collector was selected and a variable number of raters were selected randomly from among all nodes. The amount of time required to determine the aggregate rating was measured, and the experiment was repeated 20 times and average reported.

Figure 8:
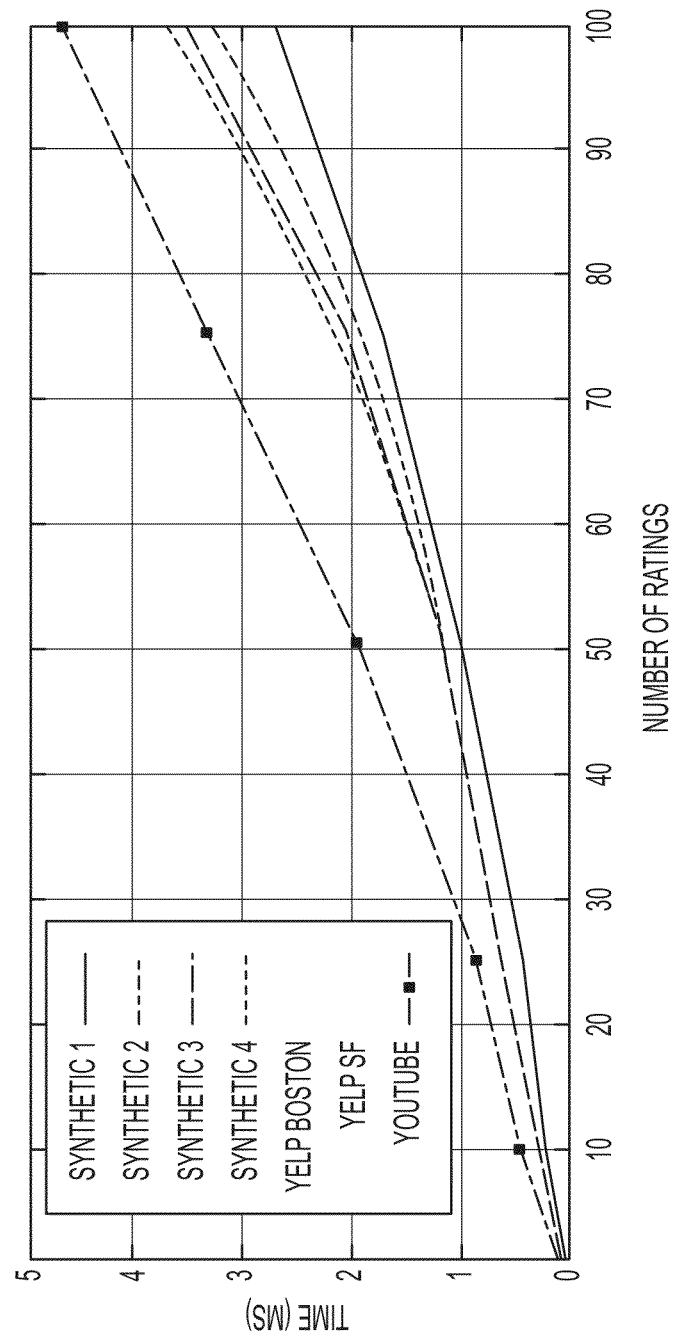
FIG. 8 illustrates the Sybil influence as the number of non-malicious raters is varied, according to some embodiments of the present invention.

FIG. 8 illustrates the average system running time for gathering up to 100 ratings in different networks, according to some embodiments of the present invention. As shown in the figure, even when 100 users place a rating, the time required to determine the aggregate rating is under 5 ms in all networks. In practice, most businesses would probably take substantially less: in the Yelp dataset, only 8% of businesses have more than 100 ratings. Moreover, the site operator could cache the calculated ratings, either with a fixed time-out or until a certain number of new ratings are provided. In some embodiments of the system described herein, only the social network is stored in memory. As a result, the memory requirements of the system are determined by the memory requirements of a program storing the social network. On a similarly configured server, the system has been shown to scale to networks containing hundreds of millions of links.

Comparison Against SumUp

As SumUp was only designed to mitigate the effect of Sybil attacks (and not rating-buying attacks), the comparison only considers Sybil attacks.

While the system described herein can be a weighing system which assigns a weight to every rater, SumUp either accepts or rejects a user's rating outright. To make a head-to-head comparison, single performance measure which fits both systems should be used. To do so, SumUp can also be considered a weighing system, which assigns weights 0 or 1 to raters that are rejected or accepted, respectively. The metric Sybil influence can be defined as shown in Equation 4 as $$\text{Sybil influence} = \frac{\text{Aggregate weight of Sybils}}{\text{Aggregate weight of all raters}}$$

representing the fraction of the total weight controlled by the Sybils. The smaller the Sybil influence value is, the better the system is at mitigating Sybil attacks.

Varying Non-Malicious Raters

Figure 9A:
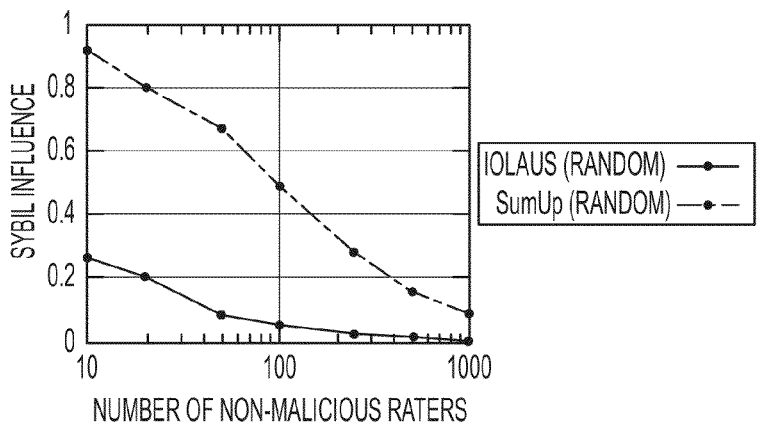
FIGS. 9(a)-9(c) illustrate the average running time for gathering up to 100 ratings in different networks, according to some embodiments of the present invention.
Figure 9B:
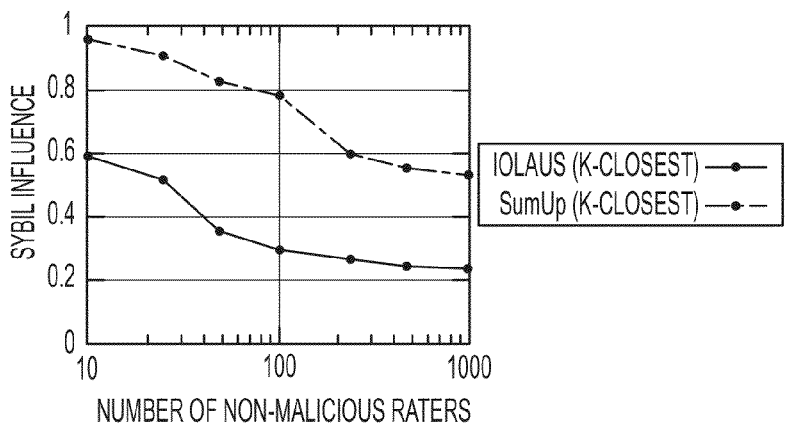
Figure 9C:
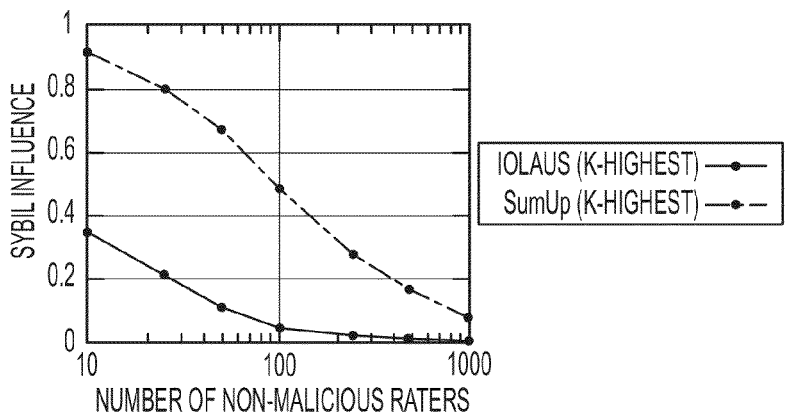

FIGS. 9(a)-(c) show the average running time for gathering up to 100 ratings in different networks, according to some embodiments of the present invention. With k=200, FIG. 9(a) shows random attacked nodes, FIG. 9(b) shows k-closest attacked nodes, and FIG. 9(c) shows k-highest degree attacked nodes.

As the number of non-malicious raters increases, with a fixed number of attack links, it is expected that both SumUp and the system described herein have lower Sybil influence. In this experiment, a random collector and 100 attack links were selected, and the number of non-malicious raters was varied. The experiment was repeated 20 times and the average Sybil influence reported.

As shown in FIG. 8, for all cases, the system described herein outperforms SumUp in reducing the impact of Sybils. The underlying reason is that in SumUp, for the random and k-highest degree attacked nodes, the Sybil raters are able to use each of the 100 attack links to get one rater accepted, allowing the Sybils to have significant influence.

In the case of the k-closest nodes strategy, Sybils are able to be part of SumUp's "envelope" around the collector, enabling them to cast multiple votes per attack link. With the system described herein, the Sybils' 100 attack links are forced to compete with all of the non-malicious raters' links. Sybils in the system described herein still manage to receive significant weight as they are very close to the collector, but have substantially lower influence than SumUp. With most content objects having few ratings, improved performance with few non-malicious raters can be extremely important.

Varying Attack Links

Figure 10A:
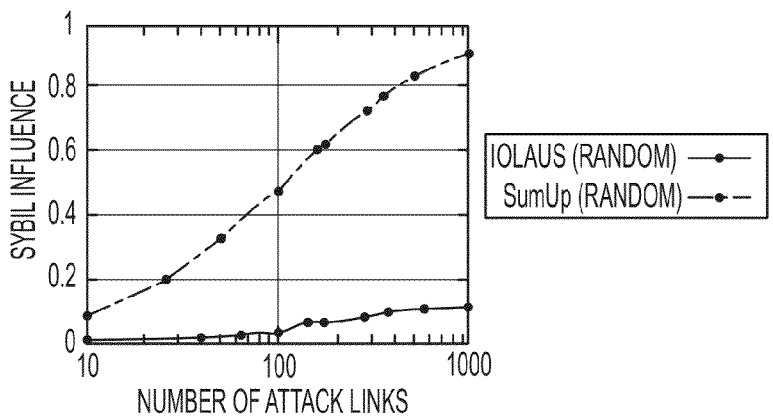
FIGS. 10(a)-10(c) illustrate the Sybil influence as the number of attack links is varied, according to some embodiments of the present invention.
Figure 10B:
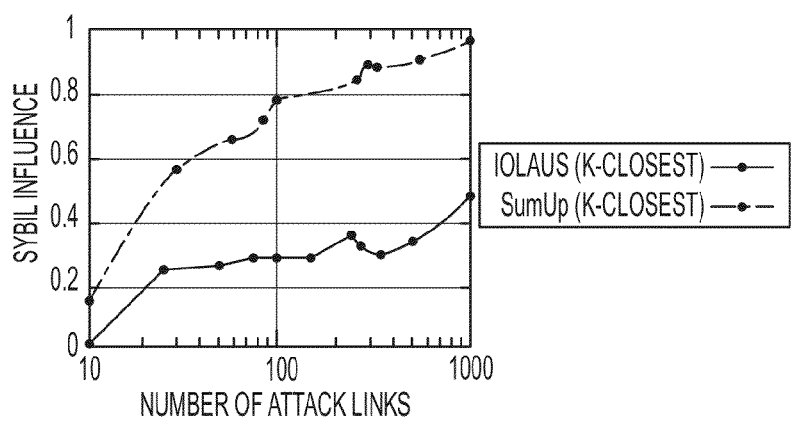
Figure 10C:
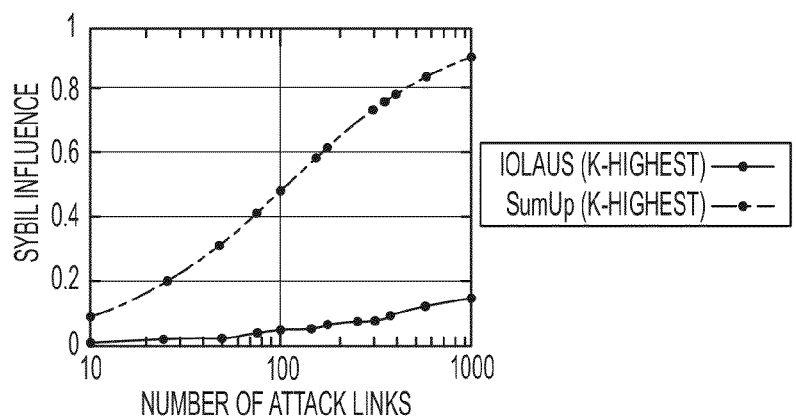

FIGS. 10(a)-(c) show the Sybil influence as the number of attack links is varied for different attack strategies on the YouTube graph with 100 non-malicious raters, according to some embodiments of the present invention. FIG. 10(a) shows a graph for random attacked nodes, FIG. 10(b) shows a graph for k-closest, and FIG. 10(c) shows a graph with k-highest degree attacked nodes.

An assumption is that as the number of attack links increases, the Sybil influence should increase linearly. In this experiment, a random collector and 100 random non-malicious raters were selected, and a number of attack links were varied. As before, the experiment was repeated 20 times and the average was reported.

The system as described herein had a lower Sybil influence than SumUp under all three cases. The reason for the superior performance is the same as before: in SumUp, the Sybil raters are able to use each of the attack links to get one rating accepted for random and k-highest attacks, and multiple ratings accepted for the k-closest attack. In the system as described herein, the Sybil raters compete with the aggregate links of the non-malicious raters.

Implementation on Yelp

Ranking Performance

The performance of the system described herein was analyzed for overall ranking performance. First, the global ranking of businesses was examined. Yelp data sets from Boston and San Francisco were used. The rankings generated by the system described herein were compared to Yelp's current ranking Second, the per-collector ranking of businesses was examined by comparing to ground-truth rankings provided by users.

In order to compare two rankings, the metric Area under the Receiver Operating Characteristic (ROC) curve or A' was used. This metric compares two ordered lists and represents the probability that the relative ranking of two items is in the same order in both lists. Therefore, the A' metric takes on values between 0 and 1: A value of 0.5 represents no correlation between the lists, with higher values indicating a better match and 1 representing a perfect match between the two lists.

Figure 11:
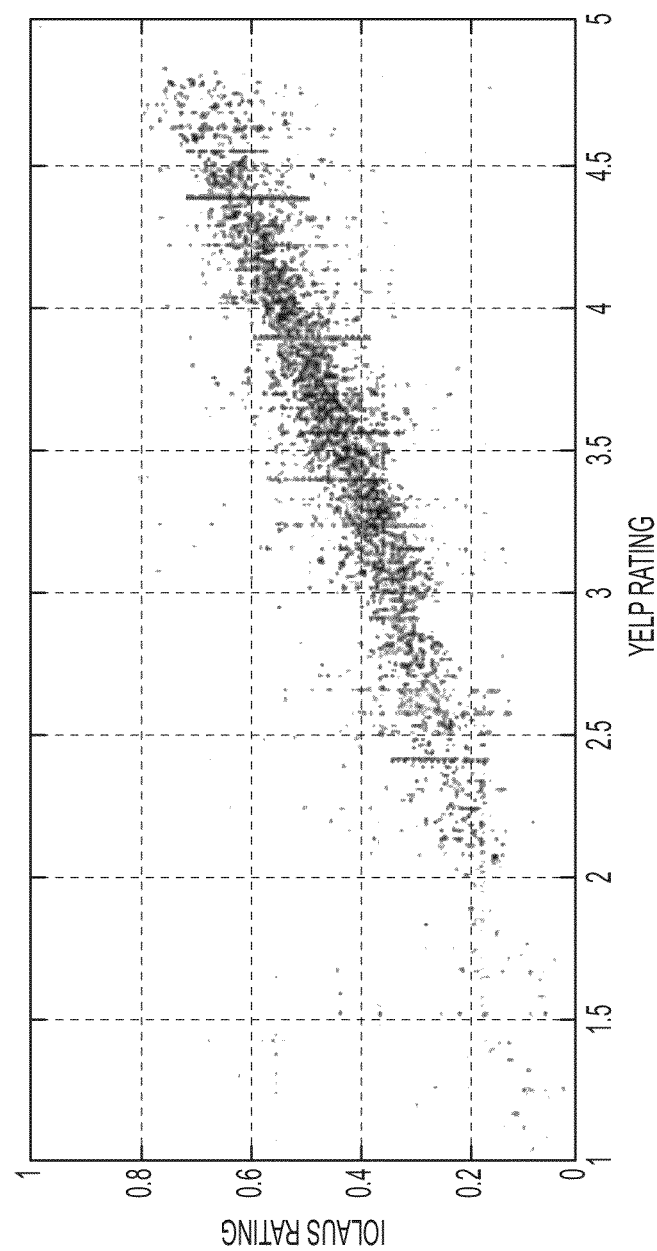
FIG. 11 illustrates a scatterplot of ratings generated by the system described herein and Yelp's ratings, according to some embodiments of the present invention.

FIG. 11 shows a scatterplot of ratings generated by the system described herein versus Yelp's ratings for all Yelp Boston businesses, according to some embodiments of the present invention. To examine the global ranking, all 9,228 Yelp Boston businesses were ranked using the system described herein for 10 randomly selected collectors. An average was taken of the ranking across these 10 collectors to be the overall ranking of each business. The order of ranked businesses in the system described herein was compared to Yelp's order. The order of the system described herein compares to Yelp's order with an A' of 0.88. This indicates a strong agreement between the two orders, indicating that the system described herein does not significantly impact the ordering when Sybil and rating-buying attacks are not occurring.

FIG. 12 shows the accuracy (A') of different systems in predicting users' rankings of businesses, according to some embodiments of the present invention. The ranking error of Yelp, SumUp, and the system described herein were compared. To do so, a set of 500 users was first selected who had ranked at least 10 businesses. For each of these users, the ratings of the businesses that each user rated was calculated using Yelp, SumUp, and the system described herein, respectively, excluding the user's own rating. Each of these ratings were essentially predicted ratings. The predicted ratings were compared to the actual ratings provided by the user, and the differences measured using A'. FIG. 11 shows that all three systems are comparable. This indicates that the system described herein does not dramatically change the rankings of businesses.

Defending Against Sybils

The next experiment involved simulating Sybils that placed highly positive ratings on a target business, and using the k-highest degree attack strategy with k=200. To influence the ranking for many collectors, Sybils can be best served by attacking high-degree nodes. The experiment involved comparing the relative score of different businesses. To make the results comparable across cities and repetitions of the same experiment, only businesses with exactly 10 ratings were considered.

To measure the impact of the Sybil attack, a target business was first selected from the lowest-ranked 25% of businesses with 10 ratings. The target business is the business that is trying to conduct a Sybil attack or "buy" ratings to increase its ranking. A list of businesses was next selected to compare the target business against. These business were selected with a wide distribution of ranks—up to 20 businesses with an average rating in each ½★ interval—resulting in a list of 111 businesses (not all intervals contain 20 businesses). Finally, the impact rating manipulation was measured by measuring the difference (in terms of the number of places) the target business moves up in the ranking of 111 businesses after manipulation. This metric is referred to as ranking movement. Lower ranking movement is better. An ideal system would allow 0 ranking movement.

Figure 13:
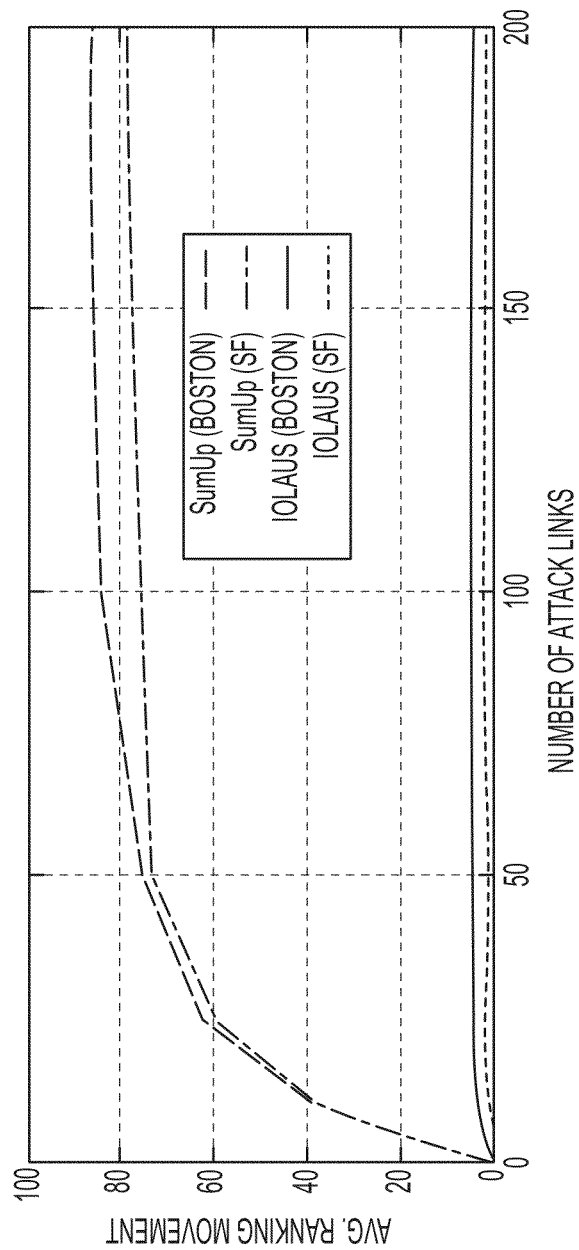
FIG. 13 illustrates an average ranking movement under different numbers of attack links, according to some embodiments of the present invention.

FIG. 13 shows the average ranking movement for 10 target businesses conducting Sybil attacks, averaged across 10 randomly selected collectors, according to some embodiments of the present invention. With SumUp, the target business is able to significantly change the ranking, making itself appear much more highly ranked. This manipulation is possible as SumUp allows the Sybils to place an additional rating with each additional attack link. However, the system described herein manages to much more tightly bound the Sybils' influence, allowing significantly less ranking manipulation.

Defending Against Rating "Buying"

Next, the ability for the system described herein to defend against rating-buying attacks is investigated. In these experiments, Sybils or attack links are added, but instead, varying number of random non-malicious users are selected to provide "bought" ratings. The non-malicious users are simulated providing highly positive reviews on a business. To evaluate the impact of this attack, the same businesses as described in the last section were used, and the impact of the attack using ranking movement was measured.

Figure 14:
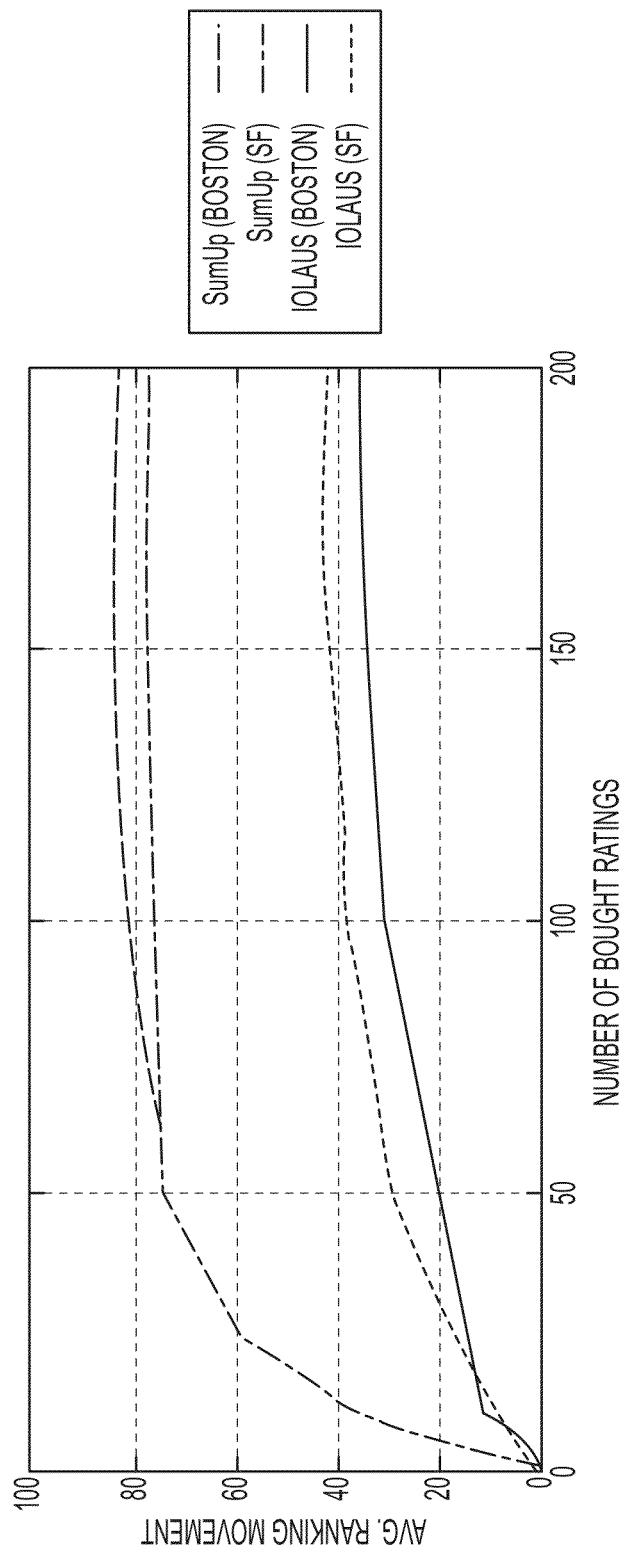
FIG. 14 illustrates an average ranking movement under different numbers of "bought" ratings, according to some embodiments of the present invention.

FIG. 14 presents the results of this experiment, according to some embodiments of the present invention. As before, the results are the average across the same 10 collectors as in the previous section. As shown in FIG. 14, without any resistance to rating-buying attacks in SumUp, malicious users are able to influence the overall ranking the business receives. However, with the system described herein, the overall impact on the target business's ranking is much lower, as the relative ratings reduce the impact of the purchased ratings.

Comparing FIGS. 13 and 14, it is observed that rating-buying is a much stronger attack than Sybil attack, and has greater impact on final ratings. This result is expected, as bought ratings come from legitimate users who are likely well-integrated into the social network. However, the system described herein performs much better against such attacks in comparison to SumUp, which was not designed to protect against rating "buying."

While given components of the system have been described separately, one of ordinary skill in the art also will appreciate that some of the functions may be combined or shared in given executable instructions, program sequences, code portions, and the like.

The subject matter described herein can be implemented in digital electronic circuitry, or in computer software, firmware, or hardware, including the structures and components disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

We claim:

1. A computer-implemented method of determining at least one weighted online content rating, the method comprising:
   receiving, by a computing device at an operator, an identity of a collector, a list of raters, and a social graph,
      the operator including a gatherer of online ratings,
      the collector including a user in the social graph,
      the list of raters including at least one rater operably connected to the collector through the social graph,
      the at least one rater including a user who has left an online rating, and
      the social graph including a plurality of nodes and links, a link including a connection between a first node and a second node, the first node including a first user, and the second node including a second user;
   receiving, by the computing device, for the at least one rater a metric, the metric including a value corresponding to an online rating left by the at least one rater;
   receiving, by the computing device, a path list for the at least one rater including at least one path from the at least one rater to the collector, a path including a list of nodes and links forming the connection between the at least one rater and the collector;
   determining, by the computing device, for the at least one rater a set of non-intersecting paths between the rater and the collector, and for each non-intersecting path, assigning a unit capacity value to each link in the at least one non-intersecting path;
   calculating, by the computing device, a capacity value for each link across all nonintersecting paths, and determining the link values that are overcapacity, an overcapacity link including a link with a capacity value greater than a unit capacity value;
   normalizing, by the computing device, path values including overcapacity links in order from the least-overcapacity to the most-overcapacity;
   adding, by the computing device, the normalized path values for each non-intersecting path corresponding to the at least one rater to determine the at least one rater's weight; and
   applying, by the computing device, the at least one rater's weight to the at least one rater's rating.

2. The computer-implemented method of claim 1, wherein the online rating comprises at least one of:
   i) a number or portion thereof of stars, and
   ii) a numerical score.

3. The computer implemented method of claim 1, wherein the metric further comprises at least one of an identity of the user and a content being rated.

4. The computer implemented method of claim 1, wherein the link comprises at least one of a mutual agreement between the first user and the second user to become friends, and a number of interactions between the first user and the second user that exceed a threshold value.

5. The method of claim 1, wherein the online rating comprises a relative rating for a first item.

6. The method of claim 5, further comprising calculating the relative rating for the first item, the method comprising:
   receiving, by the computing device, a list of at least one additional item rated by the at least one rater;
   assigning, by the computing device, a relative rating to the first item equal to the received rating when the list does not include at least one other item;
   assigning, by the computing device, a relative rating to the first item when the list includes at least one other item rated by the rater, the method of assigning a relative rating comprising:
      receiving, by the computing device, a rating for each of the other items rated by the rater;
      ordering, by the computing device, the items by rating from the lowest rating to the highest rating and assigning each item a number corresponding to the order;
      calculating, by the computing device, a transformed rating for the first item including subtracting 0.5 from the order number of the first item and dividing the difference by the total number of ratings in the list;
      when the first item has the same rating as at least one other item, calculating, by the computing device, a relative rating for the first item comprising averaging the transformed rating of items that share the same rating; and
      when the first item does not have the same rating as at least one other item, assigning, by the computing device, a relative rating for the first item equal to the transformed rating for the first item.

7. A computer-implemented method of determining a relative rating given by a rater for a first item, the method comprising:
   receiving for the rater, by a computing device, a rating for the first item, the rater including a user in a social network, the social network including a plurality of nodes and links, a link including a connection between a first node and a second node, the first node including a first user, and the second node including a second user;
   receiving, by the computing device, a list of at least one additional item rated by the rater;
   assigning, by the computing device, a relative rating to the first item equal to the received rating when the list does not include at least one other item;
   assigning, by the computing device, a relative rating to the first item when the list includes at least one other item rated by the rater, the method of assigning a relative rating comprising:
      receiving, by the computing device, a rating for each of the other items rated by the rater;
      ordering, by the computing device, the items by rating from the lowest rating to the highest rating and assigning each item a number corresponding to the order;
      calculating, by the computing device, a transformed rating for the first item including subtracting 0.5 from the order number of the first item and dividing the difference by the total number of ratings in the list;
      when the first item has the same rating as at least one other item, calculating, by the computing device, a relative rating for the first item comprising averaging the transformed rating of items that share the same rating; and
      when the first item does not have the same rating as at least one other item, assigning, by the computing device, a relative rating for the first item equal to the transformed rating for the first item.

8. The computer-implemented method of claim 7, wherein the online rating comprises at least one of:
   i) a number or portion thereof of stars, and
   ii) a numerical score.

9. The computer-implemented method of claim 7, wherein ordering the items from the lowest rating to the highest rating comprises selecting at random the sequence of order numbers for items with the same rating.

10. The computer implemented method of claim 7, wherein the link comprises at least one of a mutual agreement between the first user and the second user to become friends, and a number interactions between the first user and the second user that exceed a threshold value.

11. A system to determine at least one weighted online content rating, the system comprising:
a receiving module configured to:
receive at an operator, an identity of a collector, a list of raters, and a social graph, the operator including a gatherer of online ratings,
the collector including a user in the social graph,
the list of raters including at least one rater operably connected to the collector through the social graph,
the at least one rater including a user who has left an online rating, and
the social graph including a plurality of nodes and links, a link including a connection between a first node and a second node, the first node including a first user, and the second node including a second user;
receive for the at least one rater a metric, the metric including a value corresponding to an online rating left by the at least one rater; and
receive a path list for the at least one rater including at least one path from the at least one rater to the collector, a path including a list of nodes and links forming the connection between the at least one rater and the collector; and
a rating module operably connected to the receiving module, configured to:
determine for the at least one rater a set of non-intersecting paths between the rater and the collector, and for each non-intersecting path, assign a unit capacity value to each link in the at least one non-intersecting path;
calculate a capacity value for each link across all non-intersecting paths, and determine the link values that are overcapacity, an overcapacity link including a link with a capacity value greater than a unit capacity value;
normalize path values including overcapacity links in order from the least-overcapacity to the most-overcapacity;
add the normalized path values for each non-intersecting path corresponding to the at least one rater to determine the at least one rater's weight; and
apply the at least one rater's weight to the at least one rater's rating.

12. The system of claim 11, wherein the online rating comprises at least one of:
i) a number or portion thereof of stars, and
ii) a numerical score.

13. The system of claim 11, wherein the metric further comprises at least one of an identity of the user and a content being rated.

14. The system of claim 11, wherein the link comprises at least one of a mutual agreement between the first user and the second user to become friends, and a number of interactions between the first user and the second user exceed a threshold value.

15. The system of claim 11, wherein the online rating comprises a relative rating for a first item.

16. The system of claim 15, further wherein the system is configured to calculate the relative rating for the first item, the system comprising:
the receiving module further configured to:
receive for the at least one rater a rating for the first item; and
receive a list of at least one additional item rated by the at least one rater; and
the rating module further configured to:
assign a relative rating to the first item equal to the received rating when the list does not include at least one other item;
assign a relative rating to the first item when the list includes at least one other item rated by the rater, the rating module configured to:
receive a rating for each of the other items rated by the at least one rater;
order the items by rating from the lowest rating to the highest rating and assigning each item a number corresponding to the order;
calculate a transformed rating for the first item including subtracting 0.5 from the order number of the first item and dividing the difference by the total number of ratings in the list;
when the first item has the same rating as at least one other item, calculate a relative rating for the first item including averaging the transformed rating of items that share the same rating; and
when the first item does not have the same rating as at least one other item, assign a relative rating for the first item equal to the transformed rating for the first item.

17. A system configured to determine a relative rating given by a rater for a first item, system comprising:
a receiving module configured to:
receive for the rater a rating for the first item, the rater including a user in a social network, the social network including a plurality of nodes and links, a link including a connection between a first node and a second node, the first node including a first user, and the second node including a second user; and
receive a list of at least one additional item rated by the rater; and
a rating module operably connected to the receiving module, configured to:
assign a relative rating to the first item equal to the received rating when the list does not include at least one other item;
assign a relative rating to the first item when the list includes at least one other item rated by the rater, the rating module configured to:
receive a rating for each of the other items rated by the rater;
order the items by rating from the lowest rating to the highest rating and assigning each item a number corresponding to the order;
calculate a transformed rating for the first item including subtracting 0.5 from the order number of the first item and dividing the difference by the total number of ratings in the list;
when the first item has the same rating as at least one other item, calculate a relative rating for the first item including averaging the transformed rating of items that share the same rating; and when the first item does not have the same rating as at least one other item, assign a relative rating for the first item equal to the transformed rating for the first item.

18. The system of claim 17, wherein an online rating comprises at least one of:
  i) a number or portion thereof of stars, and
  ii) a numerical score.

19. The system of claim 17, wherein the order of the items from the lowest rating to the highest rating comprises a random sequence of order numbers for items with the same rating.

20. The system of claim 17, wherein the link comprises at least one of a mutual agreement between the first user and the second user to become friends, and a number of interactions between the first user and the second user that exceed a threshold value.

\* \* \* \* \*